United States Patent
Rucker

(10) Patent No.: US 10,838,598 B2
(45) Date of Patent: Nov. 17, 2020

(54) FOCUS MOVEMENT BETWEEN VIRTUAL USER INTERFACE ELEMENTS AND NATIVE USER INTERFACE ELEMENTS

(71) Applicant: Apple Inc., Cupertino, CA (US)

(72) Inventor: Lee Ann Rucker, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 16/045,292

(22) Filed: Jul. 25, 2018

(65) Prior Publication Data

US 2019/0369845 A1    Dec. 5, 2019

Related U.S. Application Data

(60) Provisional application No. 62/679,873, filed on Jun. 3, 2018.

(51) Int. Cl.
| | | |
|---|---|---|
| *G06F 3/0484* | (2013.01) | |
| *G06F 3/0481* | (2013.01) | |
| *G06F 3/0486* | (2013.01) | |
| *G06F 3/0488* | (2013.01) | |

(52) U.S. Cl.
CPC ........ *G06F 3/04842* (2013.01); *G06F 3/0486* (2013.01); *G06F 3/04812* (2013.01); *G06F 3/04817* (2013.01); *G06F 3/04886* (2013.01)

(58) Field of Classification Search
CPC .......................... G06F 3/04842; G06F 3/04812
See application file for complete search history.

(56) References Cited

U.S. PATENT DOCUMENTS

| | | | | |
|---|---|---|---|---|
| 5,625,763 A | * | 4/1997 | Cirne | G06F 3/04812 715/767 |
| 6,606,106 B1 | * | 8/2003 | Mendenhall | G06F 9/451 715/854 |
| 7,263,663 B2 | * | 8/2007 | Ballard | G06F 16/9577 715/762 |
| 2003/0196174 A1 | * | 10/2003 | Pierre Cote | G06F 3/04892 715/207 |

(Continued)

OTHER PUBLICATIONS

McCloskey, "Keyboard-Only Navigation for Improved Accessibility," Apr. 6, 2014, https://www.nngroup.com/articles/keyboard-accessibility/.*

(Continued)

*Primary Examiner* — Ryan Barrett
(74) *Attorney, Agent, or Firm* — McGuireWoods LLP

(57) ABSTRACT

The present disclosure generally relates to moving focus between user interface (UI) elements that are displayed in a UI. The method includes displaying, a UI that includes a native region and a virtualized region, where native UI elements and virtual UI elements are concurrently displayed in the native and the virtualized region, respectively. While an indication of focus is on a native UI element, the method includes detecting a first user input, removing the indication on the native UI element, and displaying the indication on a first virtual UI element if native UI element is the last native UI element. While the indication is on a virtual UI element, the method includes detecting a second user input, removing the indication on the virtual UI element, and displaying the indication on the first native UI element if the virtual UI element is the last virtual UI element.

19 Claims, 30 Drawing Sheets

(56) References Cited

U.S. PATENT DOCUMENTS

| | | | | |
|---|---|---|---|---|
| 2007/0113205 A1* | 5/2007 | Bogdan | ............... | G06F 3/04892 |
| | | | | 715/825 |
| 2010/0031176 A1* | 2/2010 | Song | .................... | G06F 3/0482 |
| | | | | 715/767 |
| 2014/0245205 A1* | 8/2014 | Smith | ................. | G06F 3/04892 |
| | | | | 715/767 |
| 2016/0210008 A1* | 7/2016 | Nakao | ................. | G06F 3/04895 |
| 2018/0052581 A1* | 2/2018 | Evans | ................. | G06F 3/04812 |
| 2019/0004874 A1* | 1/2019 | Pahlavan Yali | ......... | G06F 9/542 |
| 2019/0265846 A1* | 8/2019 | Shields | ............... | G06F 3/04842 |

OTHER PUBLICATIONS

Henry et al., "Easy Checks—A First Review of Web Accessibility," Dec. 22, 2017, https://www.w3.org/WAI/test-evaluate/preliminary/.*

* cited by examiner

700 ⤵

At a first electronic device with a first display and one or more input devices, display, on the display, a user interface of an application that runs natively on the device, where the user interface includes a native region and a virtualized region
702

↓

Concurrently display a first set of one or more native user interface elements in the native region and a second set of one or more virtual user interface elements in the virtualized region
704

↓

While an indication of focus is on a user interface element of the first set of native user interface elements detect, via the one or more input devices, a first user input of a respective type
706

↓

In response to detecting the first user input while the indication of focus is on a user interface element of the first set of native user interface elements: remove display of the indication of focus on the user interface element of the first set of native user interface elements
708

In accordance with a determination that the user interface element of the first set of native user interface elements is the last user interface element of the first set of native user interface elements, display the indication of focus on a first user interface element of the second set of virtual user interface elements
710

↓

While the indication of focus is on a user interface element of the second set of virtual user interface elements, detect, via the one or more input devices, a second user input of the respective type
716

↓

In response to detecting the second user input while the indication of focus is on a user interface element of the second set of virtual user interface elements: remove display of the indication of focus on the user interface element of the second set of virtual user interface elements
718

In accordance with a determination that the user interface element of the second set of virtual user interface elements is the last user interface element of the second set of virtual user interface elements, display the indication of focus on a first user interface element of the first set of native user interface elements
720

↓

FIG. 7A

In response to detecting the first user input while the indication of focus is on the last user interface element of the first set of native user interface elements, remove display of the indication of focus on the last user interface element of the first set of native user interface elements
712

In response to detecting the first user input while the indication of focus is on the last user interface element of the first set of native user interface elements, remove display of the indication of focus on the last user interface element of the first set of native user interface elements without displaying the indication of focus on other user interface elements of the one or more user interface elements of the first set of native user interface elements
714

While the indication of focus is on a user interface element of the first set of native user interface elements, in response to detecting the first user input, and in accordance with a determination that the user interface element of the first set of native user interface elements is not the last user interface element of the first set of native user interface elements, display the indication of focus on another user interface element of the first set of native user interface elements, and
while the indication of focus is on a user interface element of the second set of virtual user interface elements, in response to detecting the second user input, and in accordance with a determination that the user interface element of the second set of virtual user interface elements is not the last user interface element of the second set of virtual user interface elements, display the indication of focus on another user interface element of the second set of virtual user interface elements
722

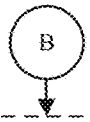

While the indication of focus is on a user interface element of the first set of native user interface elements detect, via the one or more input devices, a third user input of the respective type,
in response to detecting the third user input while the indication of focus is on the user interface element of the first set of native user interface elements:
remove display of the indication of focus on the user interface element of the first set of native user interface elements, and
in accordance with a determination that the user interface element of the first set of native user interface elements is not the last user interface element of the first set of native user interface elements, display the indication of focus on a next user interface element of the first set of native user interface elements, and
while the indication of focus is on a user interface element of the second set of virtual user interface elements, detect, via the one or more input devices, a fourth user input of the respective type,
in response to detecting the fourth user input while the indication of focus is on the user interface element of the second set of virtual user interface elements:
remove display of the indication of focus on the user interface element of the second set of virtual user interface elements, and
in accordance with a determination that the user interface element of the second set of virtual user interface elements is not the last user interface element of the second set of virtual user interface elements, display the indication of focus on a next user interface element of the second set of virtual user interface elements

724

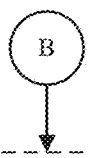

While the indication of focus is on a user interface element of the first set of native user interface elements, detect, via the one or more input devices, a third user input of the respective type,
in response to detecting the third user input while the indication of focus is on the user interface element of the first set of native user interface elements:
remove display of the indication of focus on the user interface element of the first set of native user interface elements, and
in accordance with a determination that the user interface element of the first set of native user interface elements is the last user interface element of the first set of native user interface elements, display the indication of focus on a previous user interface element of the first set of native user interface elements, and
while the indication of focus is on a user interface element of the second set of virtual user interface elements, detect, via the one or more input devices, a fourth user input of the respective type,
in response to detecting the fourth user input while the indication of focus is on the user interface element of the second set of virtual user interface elements:
remove display of the indication of focus on the user interface element of the second set of virtual user interface elements, and
in accordance with a determination that the user interface element of the second set of virtual user interface elements is the last user interface element of the second set of virtual user interface elements, display the indication of focus on a previous user interface element of the second set of virtual user interface elements

726

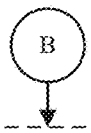

FIG. 7D

Determine a mode of the application, and in response to detecting a user input of the respective type, determine whether to display the indication of focus on a user interface element of the first set of native user interface elements or a user interface element of the second set of virtual user interface elements based on the mode of the application
728

In response to detecting the first user input while the indication of focus is on a user interface element of the first set of native user interface elements:
while the application is in a first mode, and in accordance with a determination that the user interface element of the first set of native user interface elements is the last user interface element of the first set of native user interface elements, display the indication of focus on the first user interface element of the second set of virtual user interface elements
730

In response to detecting the first user input while the indication of focus is on a user interface element of the first set of native user interface elements:
while the application is in a second mode, and in accordance with a determination that the user interface element of the first set of native user interface elements is the last user interface element of the first set of native user interface elements, displaying the indication of focus on the first user interface element of the first set of native user interface elements.
732 in response to detecting the second user input while the indication of focus is on a user interface element of the second set of virtual user interface elements:
while the application is in a third mode, and in accordance with a determination that the user interface element of the second set of virtual user interface elements is the last user interface element of the second set of virtual user interface elements, display the indication of focus on the first user interface element of the first set of native user interface elements
734 in response to detecting the second user input while the indication of focus is on a user interface element of the second set of virtual user interface elements:
while the application is in a fourth mode, and in accordance with a determination that the user interface element of the second set of virtual user interface elements is the last user interface element of the second set of virtual user interface elements, display the indication of focus on the first user interface element of the second set of virtual user interface elements
736

FIG. 7E

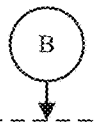

In response to detecting the second user input while the indication of focus is on the last user interface element of the second set of virtual user interface elements, remove display of the indication of focus on the last user interface element of the second set of virtual user interface elements
738

In response to detecting the second user input while the indication of focus is on the last user interface element of the second set of virtual user interface elements, remove display of the indication of focus on the last user interface element of the second set of virtual user interface elements without displaying the indication of focus on other user interface elements of the one or more user interface elements of the second set of virtual user interface elements
740

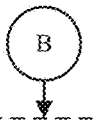

While the indication of focus is not on any of the second set of virtual user interface elements, display the virtualized region as an inactive region of the application
742

In response to detecting the first user input while the indication of focus is on a user interface element of the first set of native user interface elements, display a first animation indicative of a removal of display of the indication of focus on the user interface element of the first set of native user interface elements, and
in response to detecting the second user input while the indication of focus is on a user interface element of the second set of virtual user interface elements, display a second animation indicative of the removal of display of the indication of focus on the user interface element of the second set of virtual user interface elements
744

The native region includes borders of the user interface of the application, and the virtualized region is an internal region of the native region
746

FIG. 7F

Detect a first press gesture on a tab key of a keyboard that is communicatively connected to the electronic device, where the first user input is the first press gesture on the tab key, and
detect a second press gesture on the tab key of the keyboard, where the second user input is the second press gesture on the tab key
748

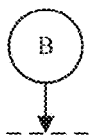

In accordance with a determination that focus is on a user interface element of the first set of native user interface elements, display the indication of focus on the user interface element of the first set of native user interface elements,
in accordance with a determination that focus is not on the user interface element of the first set of native user interface elements, remove display of the indication of focus on the user interface element of the first set of native user interface elements,
accordance with a determination that focus is on a user interface element of the second set of virtual user interface elements, display the indication of focus on the user interface element of the second set of virtual user interface elements, and
in accordance with a determination that focus is not on the user interface element of the second set of virtual user interface elements, remove display of the indication of focus on the user interface element of the second set of virtual user interface elements
750

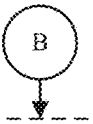

While the indication of focus is on a user interface element of the first set of native user interface elements, display the user interface element as a selectable user interface element of the first set of native user interface elements,
while the indication of focus is not on the user interface element of the first set of native user interface elements, display the user interface element as a non-selectable user interface element of the first set of native user interface elements,
while the indication of focus is on a user interface element of the second set of virtual user interface elements, display the user interface element as a selectable user interface element of the second set of virtual user interface elements, and
while the indication of focus is not on the user interface element of the second set of virtual user interface elements, display the user interface element as a non-selectable user interface element of the second set of virtual user interface elements
752

FOCUS MOVEMENT BETWEEN VIRTUAL USER INTERFACE ELEMENTS AND NATIVE USER INTERFACE ELEMENTS

CLAIM OF PRIORITY

This application claims benefit of U.S. Provisional Patent Application No. 62/679,873, entitled "FOCUS MOVEMENT BETWEEN VIRTUAL USER INTERFACE ELEMENTS AND NATIVE USER INTERFACE ELEMENTS," filed on Jun. 3, 2018, which is hereby incorporated by reference in their entireties.

FIELD

The present disclosure relates generally to computer user interfaces, and more specifically to techniques for moving focus between user interface elements that are displayed in virtualized and native regions of computer user interfaces.

BACKGROUND

Certain user interfaces that are displayed on electronic devices include native user interface elements that are displayed in native regions and virtual user interfaces that are displayed in virtualized regions of a user interface. A user may select different native user interface elements and visual user interface elements that are displayed on the user's electronic device to interact with the selected user interface elements. The electronic device, after a user enters a user input to select a user interface element, displays an indication that the user interface element has been selected by the user in the user interface. The electronic device, after the user enters another input to select a different user interface element, displays an indication that a different user interface element has been selected by the user.

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

BRIEF SUMMARY

Current methods for moving focus between user interface elements that are displayed in virtualized and native regions of a user interface are outdated, time consuming, and inefficient. For example, some existing methods use complex and time-consuming user interfaces, which may include multiple key presses or keystrokes, and may include extraneous user interfaces. In addition, these methods take longer than necessary, thereby wasting energy. This latter consideration is particularly important in battery-operated devices.

Accordingly, the present technique provides electronic devices with faster, more efficient methods and interfaces for moving focus between user interface elements that are displayed in virtualized and native regions of a user interface. Such methods and interfaces optionally complement or replace other methods for displaying focus movement. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and one or more input devices. The method includes displaying, on the display, a user interface of an application that runs natively on the device, wherein the user interface includes a native region and a virtualized region. The method also includes concurrently displaying a first set of one or more native user interface elements in the native region and a second set of one or more virtual user interface elements in the virtualized region. While an indication of focus is on a user interface element of the first set of native user interface elements, detecting, via the one or more input devices, a first user input of a respective type. In response to detecting the first user input while the indication of focus is on a user interface element of the first set of native user interface elements, the method includes removing display of the indication of focus on the user interface element of the first set of native user interface elements. In accordance with a determination that the user interface element of the first set of native user interface elements is the last user interface element of the first set of native user interface elements, the method includes displaying the indication of focus on a first user interface element of the second set of virtual user interface elements. While the indication of focus is on a user interface element of the second set of virtual user interface elements, the method includes detecting, via the one or more input devices, a second user input of the respective type. In response to detecting the second user input while the indication of focus is on a user interface element of the second set of virtual user interface elements, the method includes removing display of the indication of focus on the user interface element of the second set of virtual user interface elements. In accordance with a determination that the user interface element of the second set of virtual user interface elements is the last user interface element of the second set of virtual user interface elements, the method includes displaying the indication of focus on a first user interface element of the first set of native user interface elements.

In accordance with some embodiments, a non-transitory computer-readable storage medium comprising one or more programs, the one or more programs including instructions which, when executed by an electronic device with a display and one or more input devices, causes the electronic device to display, on the display, a user interface of an application that runs natively on the device, wherein the user interface includes a native region and a virtualized region. The instructions also cause the electronic device to concurrently display a first set of one or more native user interface elements in the native region and a second set of one or more virtual user interface elements in the virtualized region. While an indication of focus is on a user interface element of the first set of native user interface elements, the instructions cause the electronic device to detect, via the one or more input devices, a first user input of a respective type. In response to detecting the first user input while the indication of focus is on a user interface element of the first set of native user interface elements, the instructions also cause the electronic device to remove display of the indication of focus on the user interface element of the first set of native user interface elements. In accordance with a determination that the user interface element of the first set of native user interface elements is the last user interface element of the first set of native user interface elements, the instructions also cause the electronic device to display the indication of focus on a first user interface element of the second set of virtual user interface elements. While the indication of focus is on a user interface element of the second set of virtual user interface elements the instructions also cause the electronic device to detect, via the one or more input devices, a second user input of the respective type. In response to detecting the second user input while the indication of focus is on a user interface element of the second set of virtual user interface elements, the instructions also cause the electronic device to remove display of the indication of focus on the user interface element of the second set of virtual user interface elements. In accordance with a determination that the user interface element of the second set of virtual user interface elements is the last user interface element of the second set of virtual user interface elements, the instructions also cause the electronic device to display the indication of focus on a first user interface element of the first set of native user interface elements.

In accordance with some embodiments, an electronic device includes a display, one or more input devices, one or more processors, memory, and one or more programs; the one or more programs are stored in the memory and configured to be executed by the one or more processors, and the one or more programs include instructions for performing or causing performance of the operations of any of the methods described herein. In accordance with some embodiments, a non-transitory computer readable storage medium has stored therein one or more programs, the one or more programs including instructions which, when executed by one or more processors of an electronic device with a display and one or more input devices, cause the electronic device to perform or cause performance of the operations of any of the methods described herein. In accordance with some embodiments, a graphical user interface on an electronic device with a display and one or more input devices, memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, one or more input devices, and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for moving focus between user interface elements that are displayed in virtualized and native regions of a user interface, thereby increasing the effectiveness, efficiency, and user satisfaction with such devices. Such methods and interfaces may complement or replace other methods for moving focus between user interface elements that are displayed in virtualized and native regions of a user interface.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7F are flow diagrams of a process for moving focus between user interface elements that are displayed in virtualized and native regions of a user interface in accordance with some embodiments.

DESCRIPTION OF EMBODIMENTS

Figure 1A:
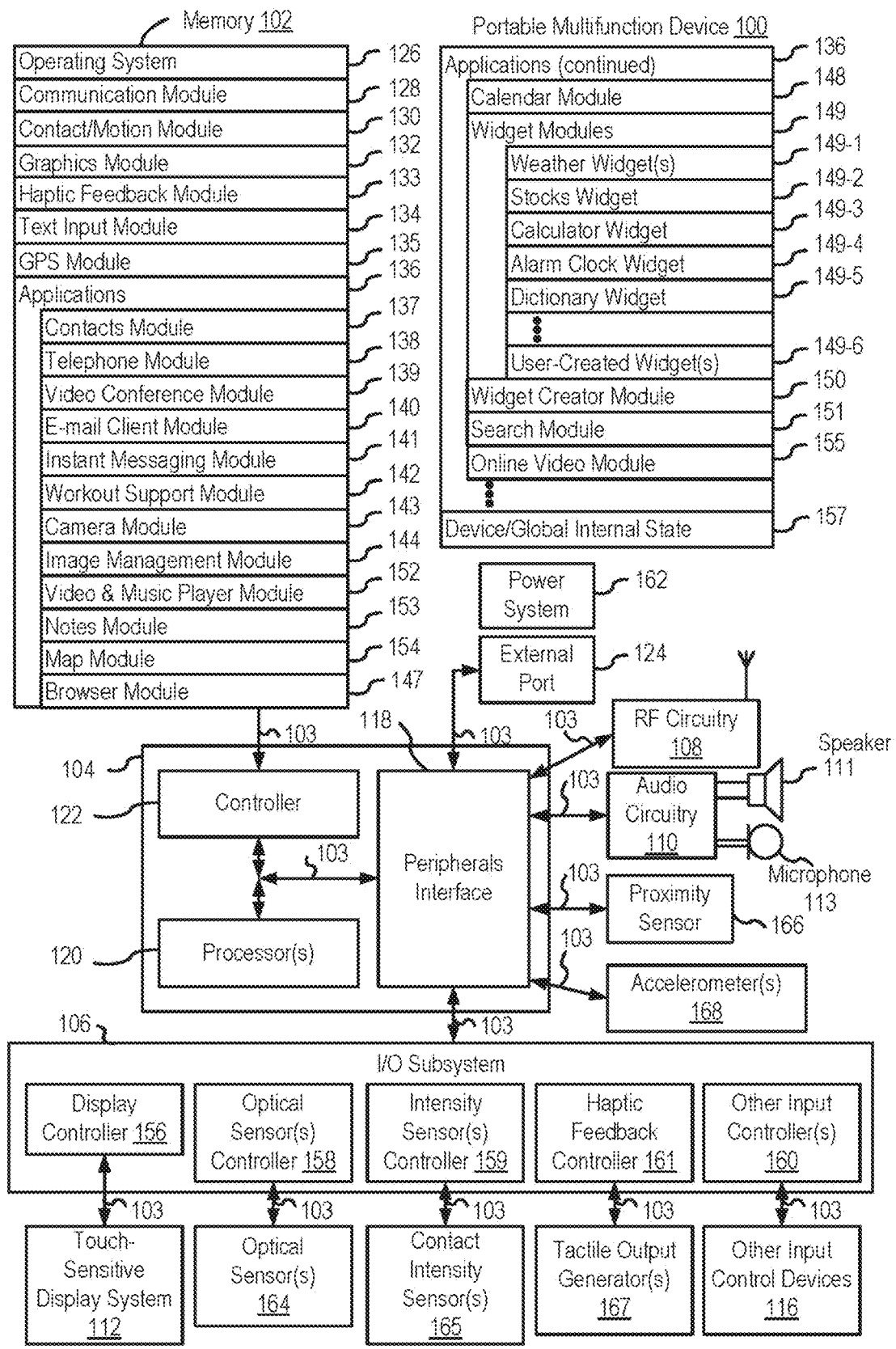
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for moving focus between user interface elements that are displayed in virtualized and native regions of a user interface. Such methods and interfaces can reduce the cognitive burden on a user when the user selects different user interface elements that are displayed in virtualized and native regions of the user interface, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for moving focus between user interface elements that are displayed in virtualized and native regions of a user interface. FIGS. 6A-6O illustrate exemplary user interfaces for moving focus between user interface elements that are displayed in virtualized and native regions. FIG. 7 is a flow diagram illustrating methods of moving focus between user interface elements that are displayed in virtualized and native regions of a user interface in accordance with some embodiments. The user interfaces in FIGS. 6A-6O are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
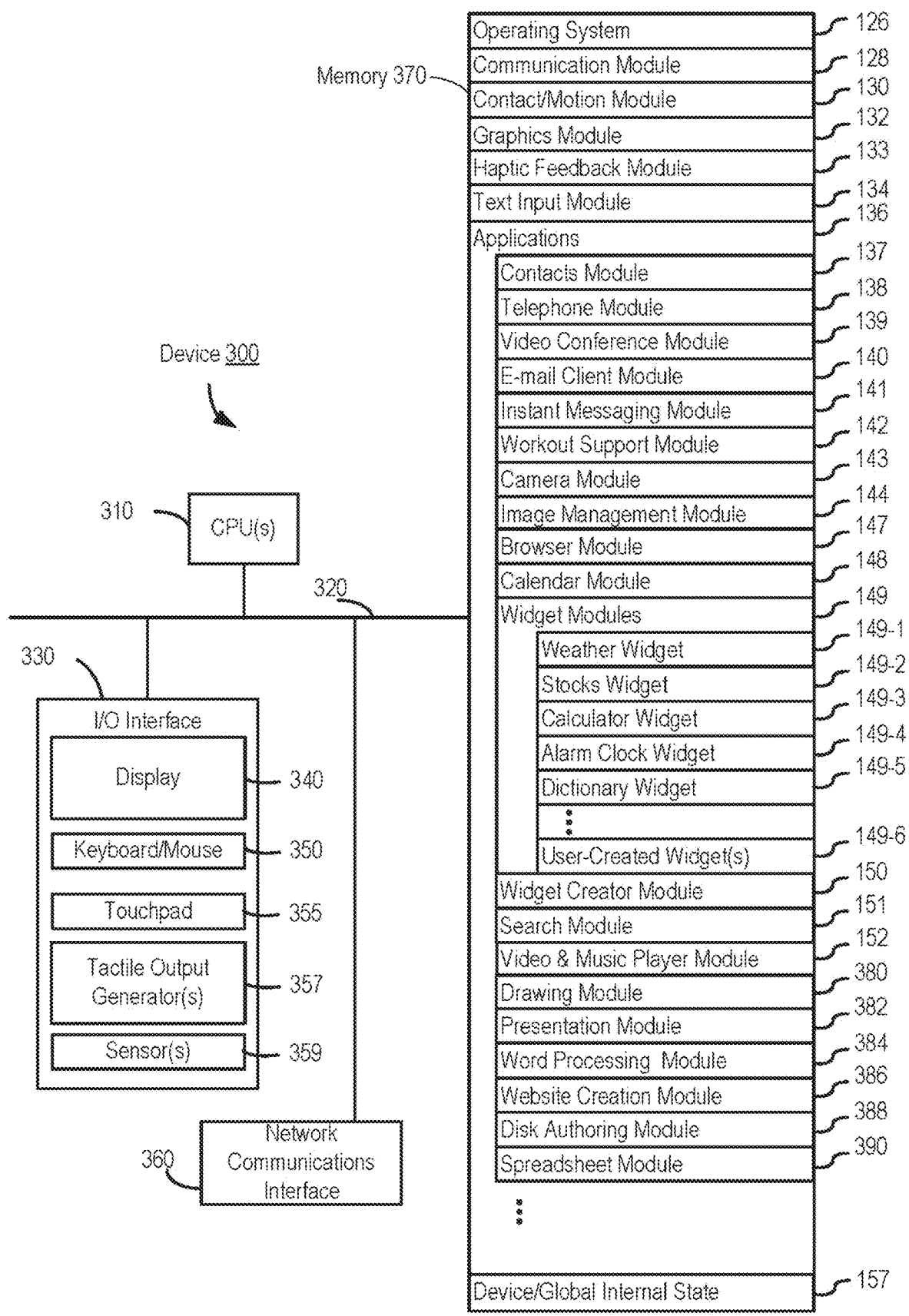
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
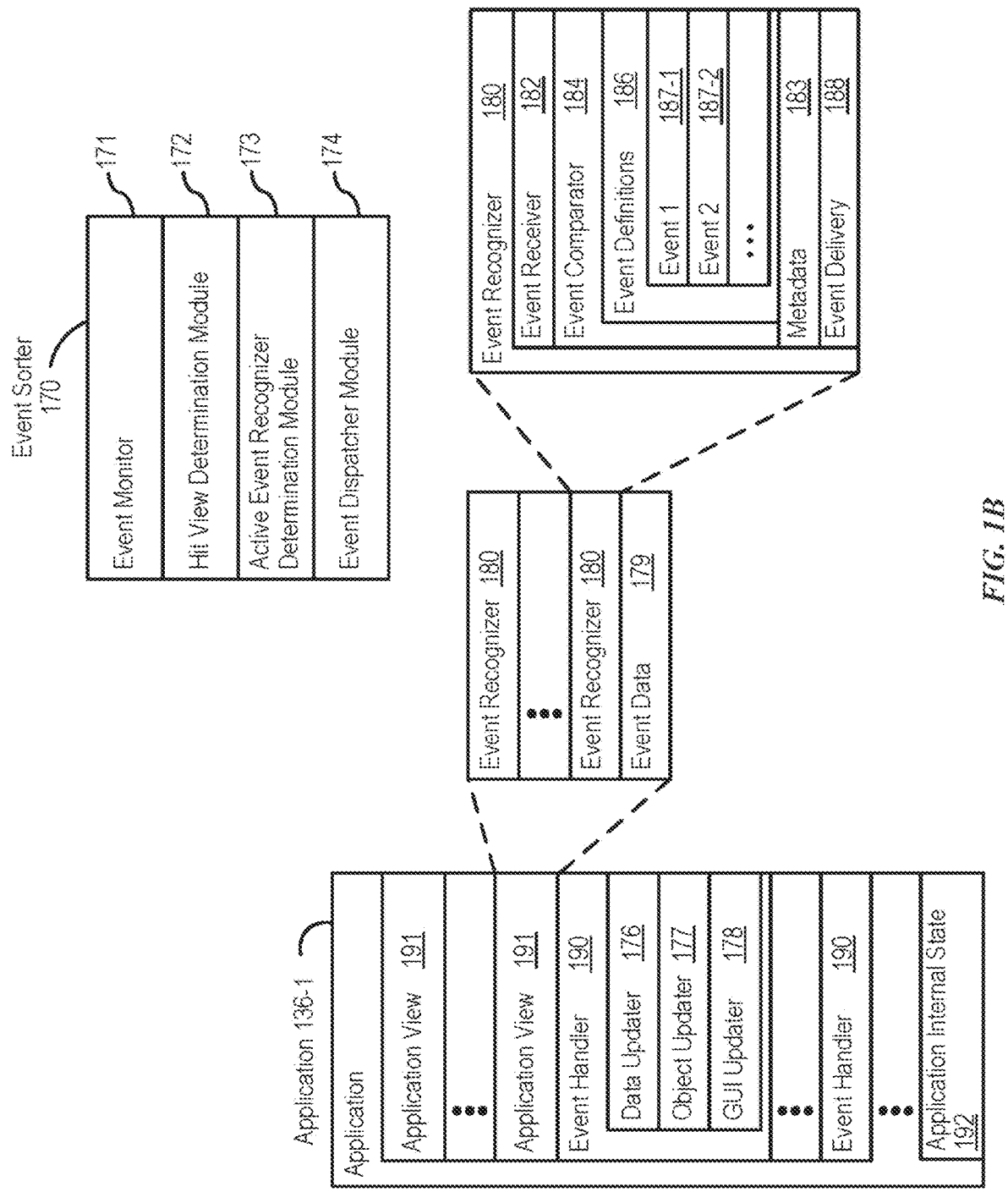
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
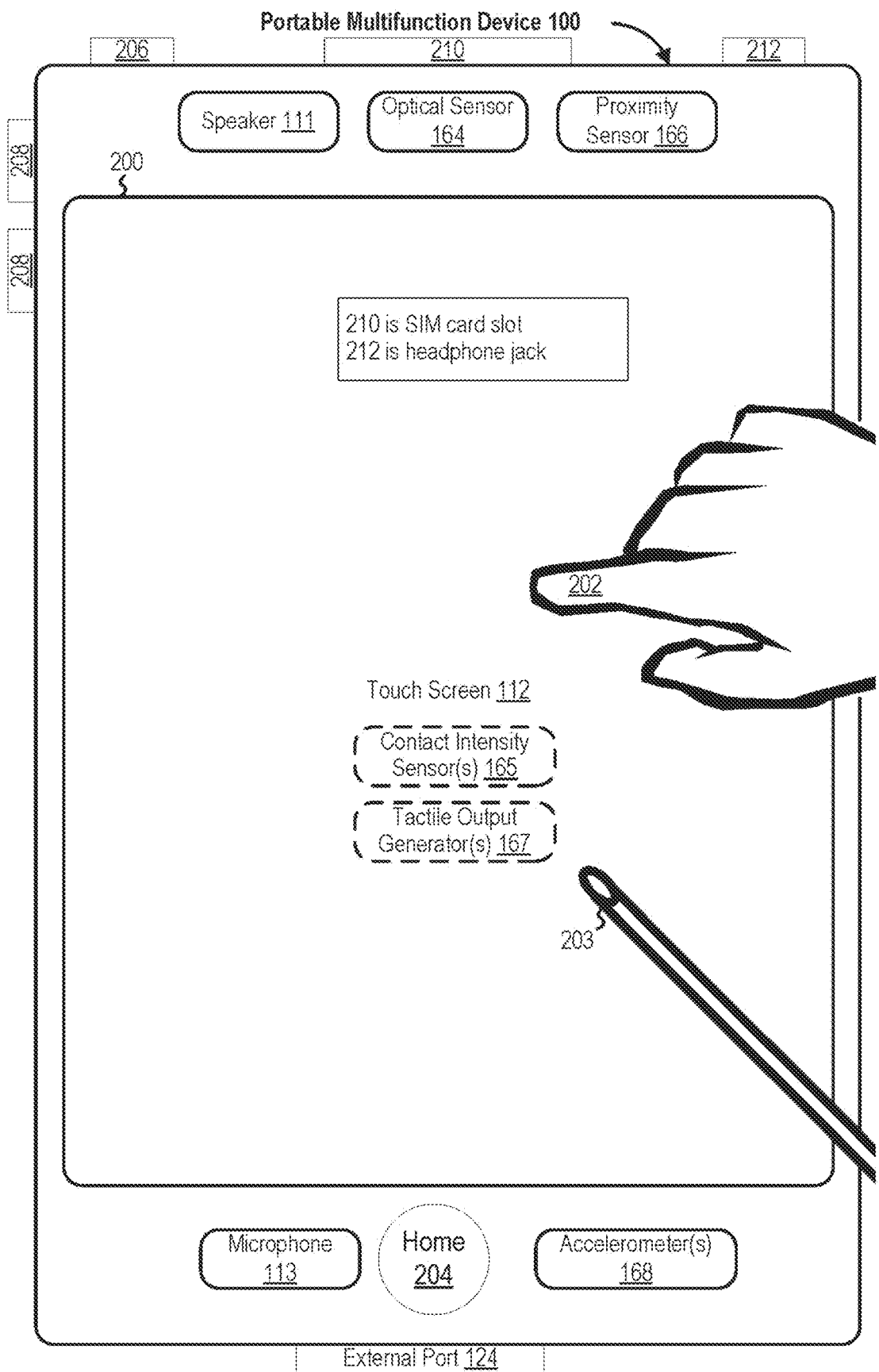
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
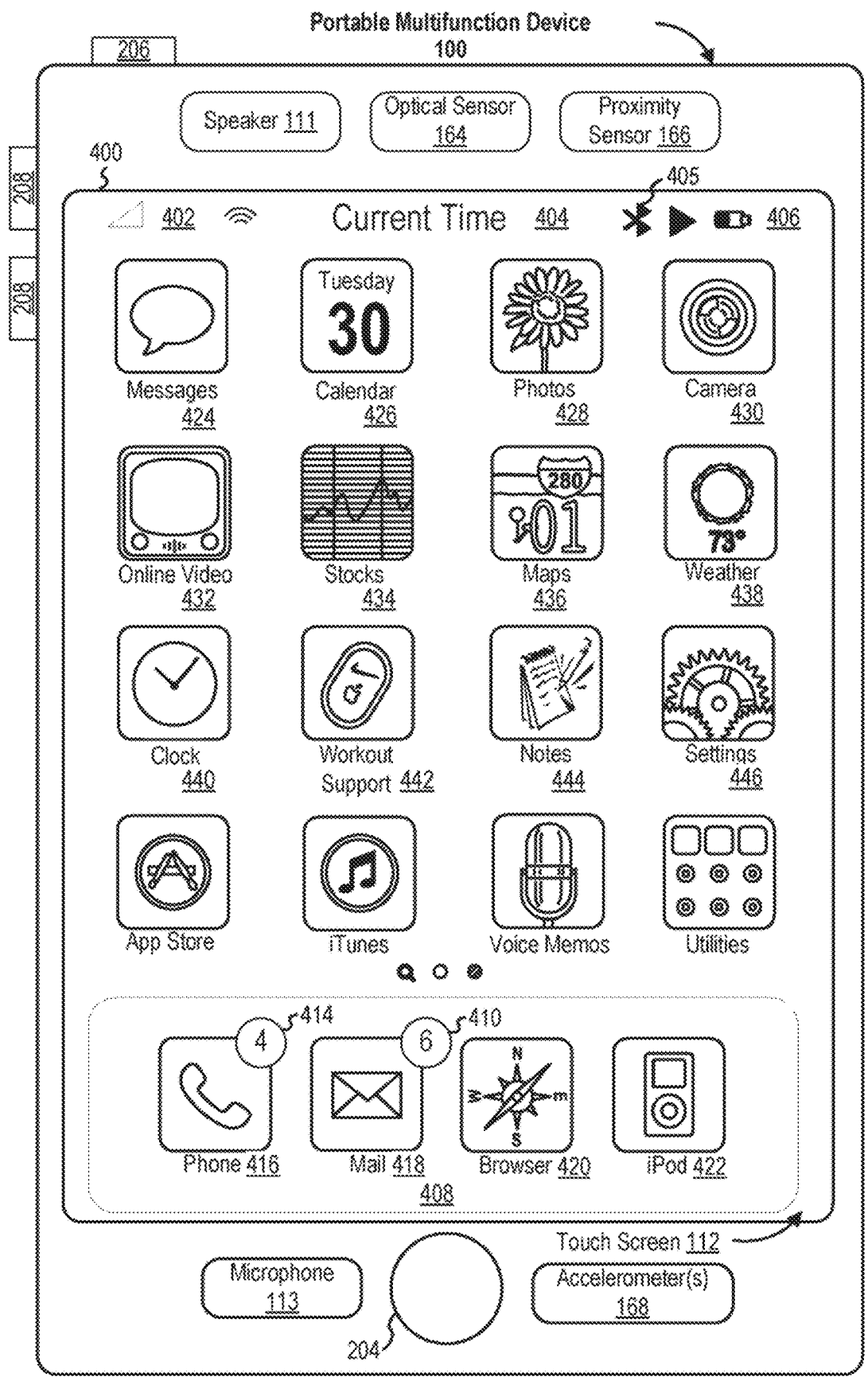
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
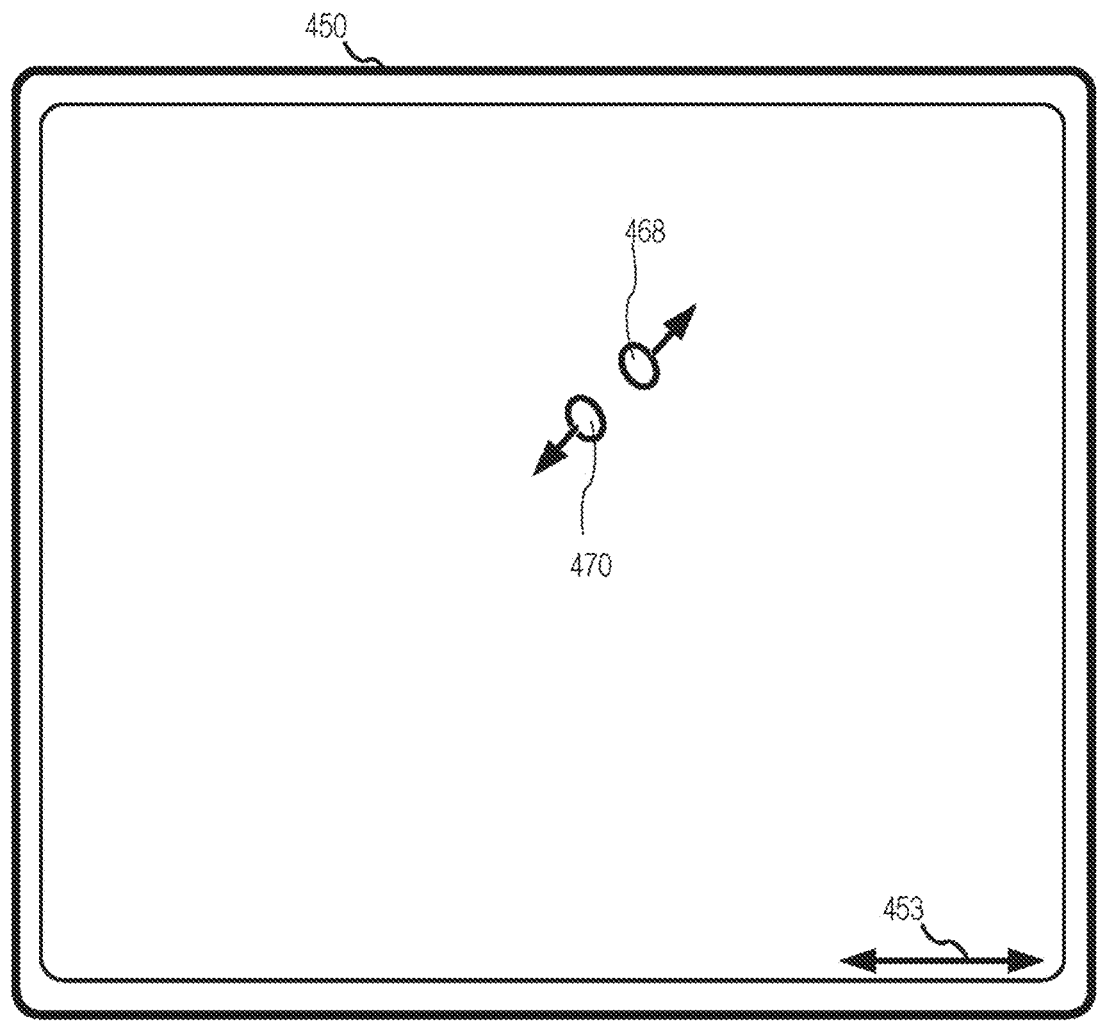
FIG. 4B illustrates an exemplary user interface for a multifunction device with a touch-sensitive surface that is separate from the display in accordance with some embodiments.
Figure 4B:
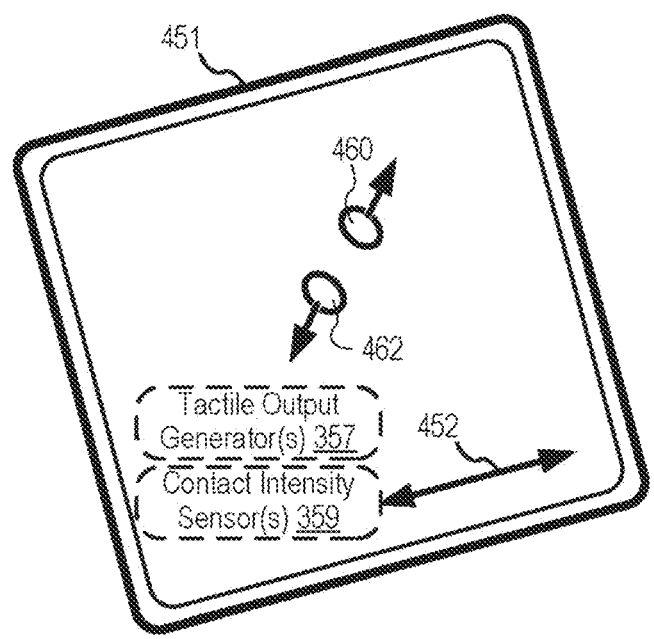

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
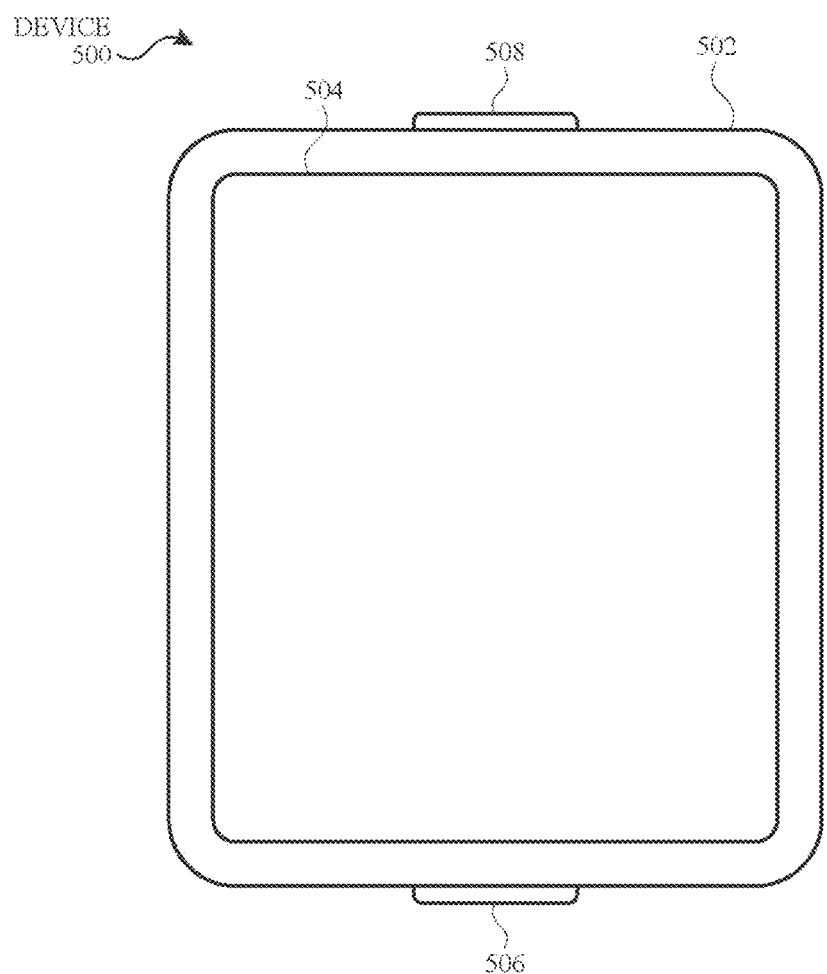
FIG. 5A illustrates a personal electronic device in accordance with some embodiments.
Figure 6A:
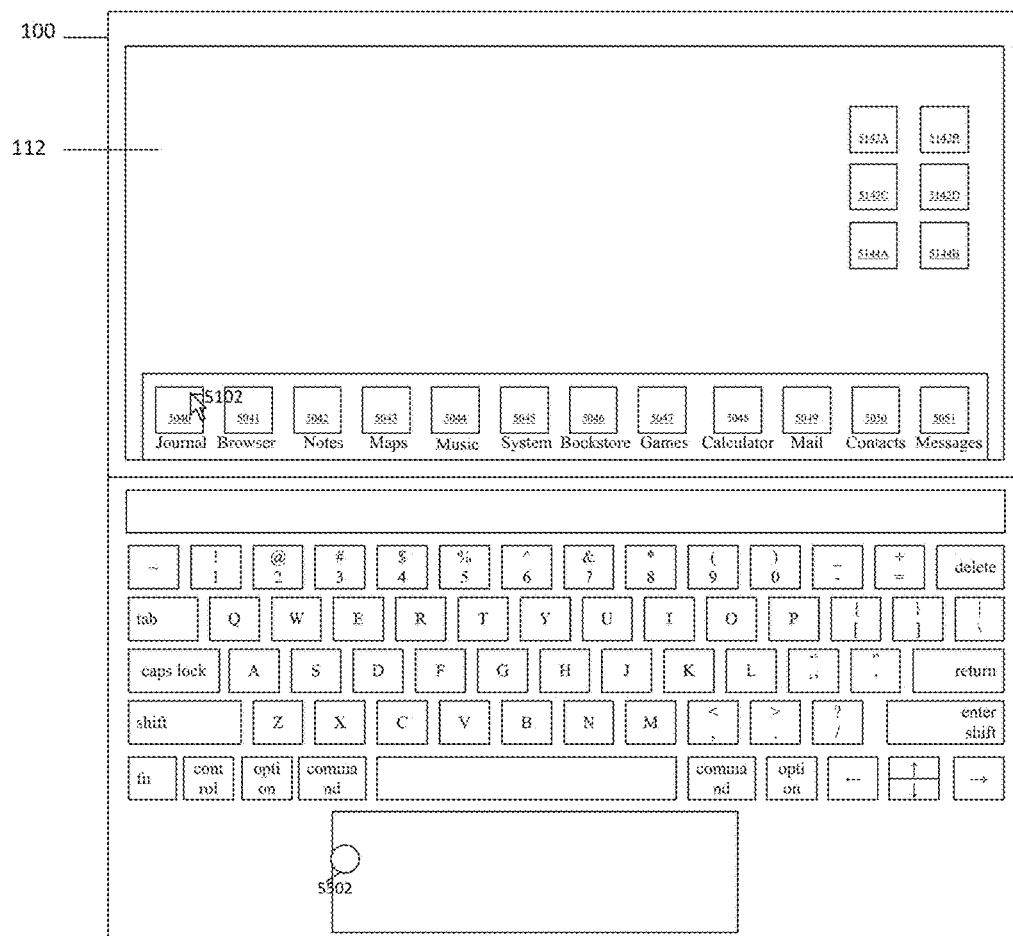
FIGS. 6A-6O illustrate example user interfaces for moving focus between user interface elements that are displayed in virtualized and native regions of a user interface in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
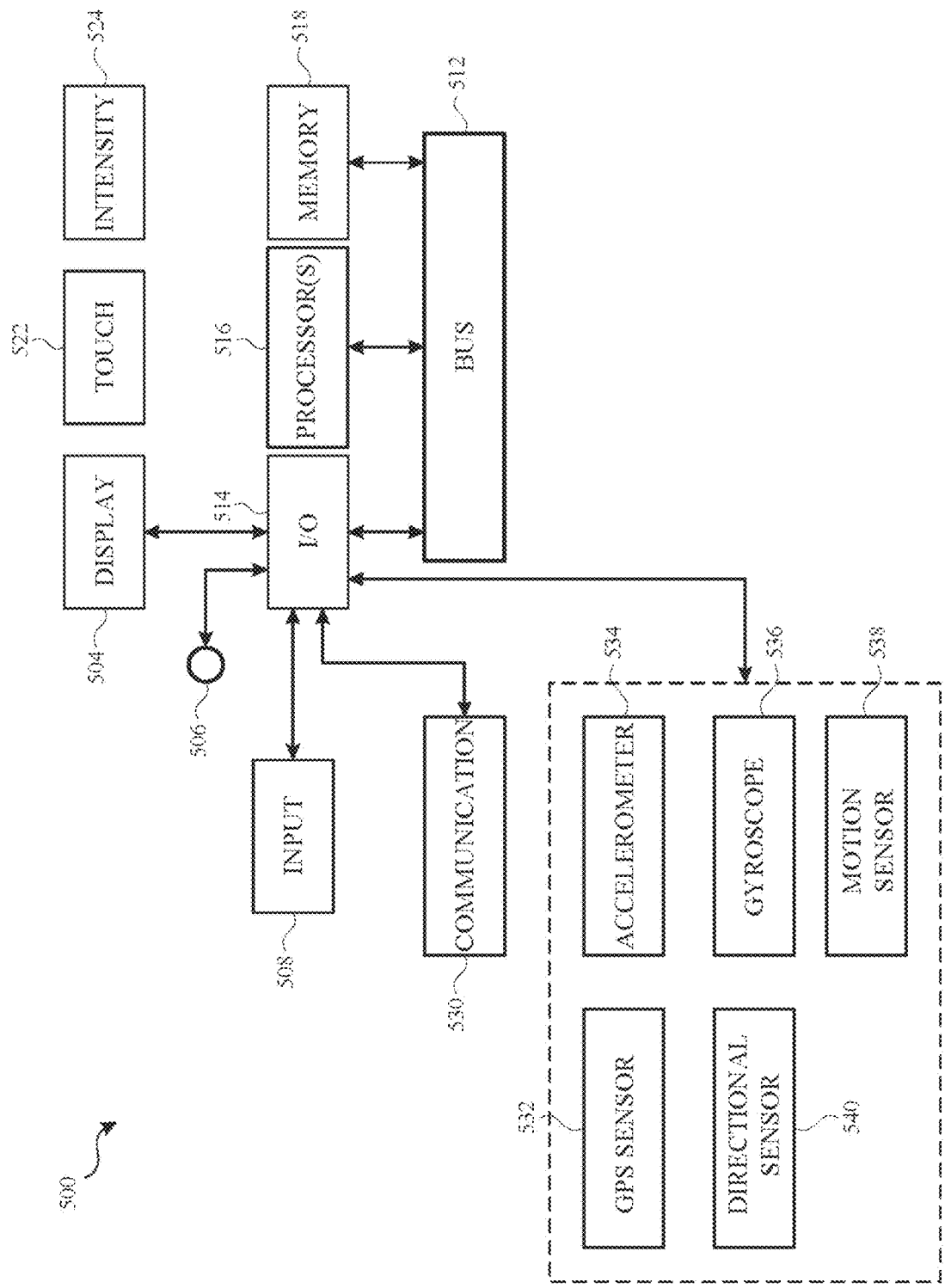
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7F). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6O illustrate exemplary user interfaces for moving focus between user interface elements that are displayed in virtualized and native regions of a user interface in accordance with some embodiments. The user interfaces in these figures are used to illustrate the processes described below, including the processes in FIGS. 7A-7F. Although some of the examples that follow will be given with reference to inputs on a touch-screen display (where the touch-sensitive surface and the display are combined) such as touch-sensitive display 112, in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

FIG. 6A illustrates device 100 having multiple application affordances 5040-5051 and content affordances 5142A-5142D and 5144A-5144B displayed on display 112 of device 100. In the illustrated embodiment, a content affordance is an affordance the user interacts with to display content associated with the content affordance, and an application affordance is an affordance that the user interacts with to access user interfaces of a corresponding application that runs on device 100. In the illustrated embodiment, journal affordance 5040 is an application affordance of a journal application. The user interacts with journal affordance 5040 to access user interfaces of the journal application. In the illustrated embodiment, a cursor 5102 is displayed over journal affordance 5040. In one or more embodiments, the user performs a press gesture over the trackpad of device 100 while cursor is displayed over journal affordance 5040 to access the journal application. In that regard, FIGS. 6A-6B illustrate detecting a press gesture with contact 5502 over a track pad of device 100 while cursor 5102 is displayed over journal affordance 5040, and in response to detecting the press gesture, displaying a user interface 5002 of the journal application.

Figure 6B:
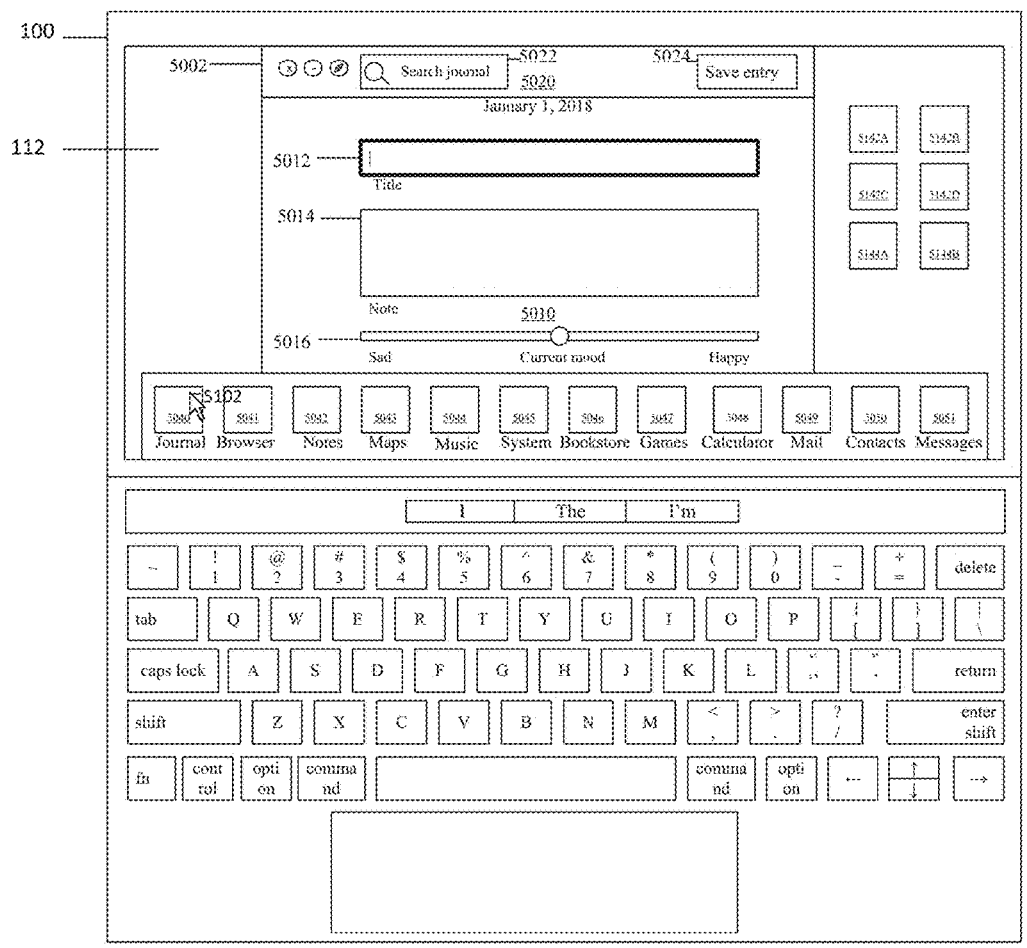
Figure 6B:
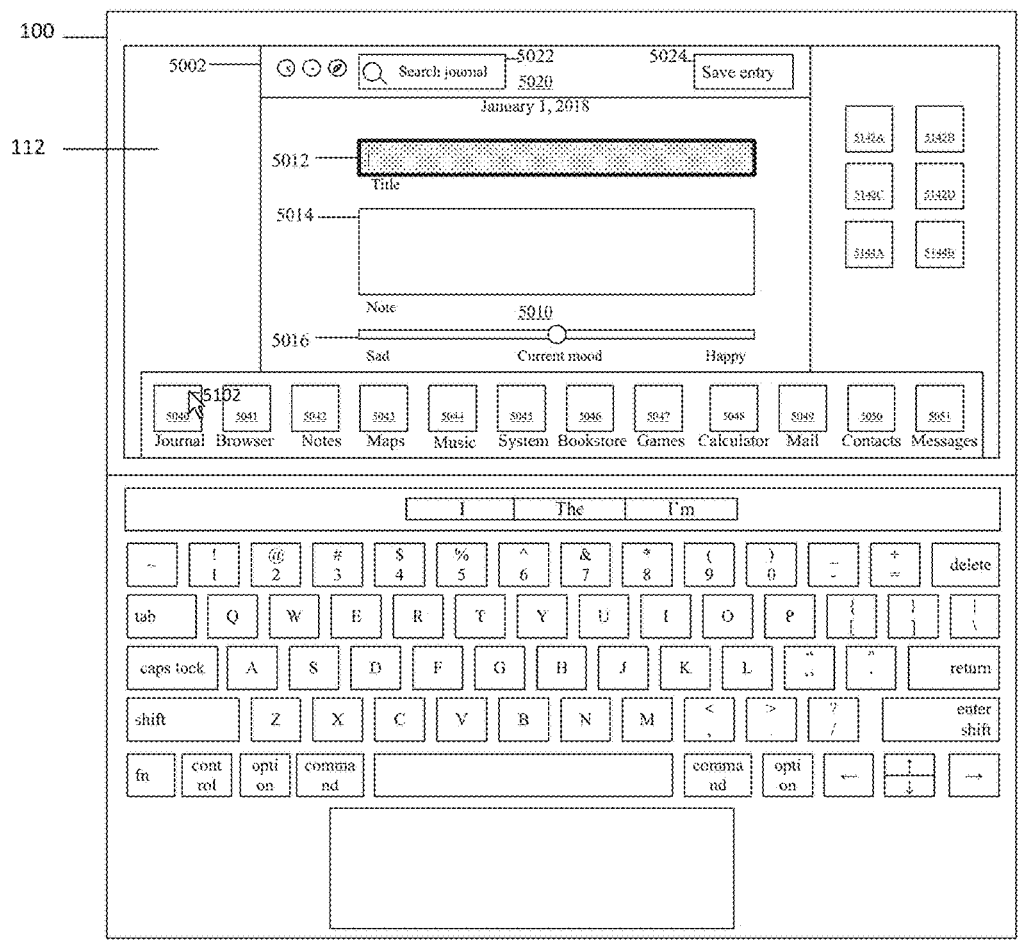

FIG. 6B illustrates user interface 5002 of the journal application. As shown in FIG. 6B, user interface 5002 includes a native region 5020 and a virtualized region 5010. Developers will, in some circumstances, develop an application (or portions of the application) to run natively on one type of electronic device and reuse instructions written for the application (e.g., a version of the journal application that runs natively on smartphones) or portions of the instructions (e.g., instructions for certain user interfaces of the application) for other versions of the application that run virtually on other types of devices (e.g., versions of the journal application that run virtually on laptop computers, tablets, smartwatches, etc.) without having to re-write the instructions. In such a manner, developers are able to write one version of updates to the instructions and use such version to update not only any application displayed natively on a device but also multiple other versions of the application that are displayed virtually on different electronic devices. As used herein, a user interface region of an application running natively on a device is referred to as a native region. In the illustrated embodiment of FIGS. 6B-6O, device 100 displays native region 5020 of user interface 5002. Similarly, a user interface region of an application running virtually on a device is referred to as a virtualized region. In the illustrated embodiment of FIGS. 6B-6O, device 100 displays virtualized region 5010. In one or more embodiments, virtualized region 5010 is a user interface region of an application that runs natively on a smartphone device.

In some embodiments, a native region of a user interface forms a frame (e.g., borders) of a user interface, whereas a virtualized region forms other portions bounded by the frame. Native region 5020 as illustrated in FIGS. 6B-6O, for example, forms an upper portion of user interface 5002, and virtualized region 5010 as illustrated in FIGS. 6B-6O forms a lower portion of user interface 5002. In the illustrated embodiment of FIGS. 6B-6O, native region 5020 and virtualized region 5010 are concurrently displayed as portions of user interface 5002 on display 112. Two native user interface elements (a search journal input box 5022 and a save entry affordance 5024) are displayed in native region 5020 and three virtualized user interface elements (a journal title input box 5012, a journal note input box 5014, and mood slider 5016) are displayed in virtualized region 5010. As used herein, a native user interface element is a user interface element that is displayed in a native region of a user interface, such as native region 5020 of user interface 5002. Further, a virtual user interface element is a user interface element that is displayed in a virtualized region of a user interface, such as virtualized region 5010 of user interface 5002. Examples of native user interface elements and virtual user interface elements include input boxes, search fields, buttons, sliders, toggles, and other suitable affordances that are displayed in the native region or the virtualized region, respectively.

In the illustrated embodiments of FIGS. 6B-6O, the user performs similar inputs to interact with virtual user interface elements that are displayed in virtualized region 5010 and native user interface elements that are displayed in native region 5020. For example, the device responds to certain inputs, such as press gestures on a tab key or other user inputs discussed herein to select or to interact with virtual user interface elements as if the virtualized user interface elements are native user interface elements that are displayed in native region 5020, or another native region of user interface 5002. Similarly, the user enters certain inputs to select different virtual user interface elements or cycle between virtual user interface elements and native user interface elements as if the virtual user interface elements are native elements that are displayed in the native region. Additional descriptions of different user inputs to select user interface elements and to cycle between different user interface elements are provided in the paragraphs below.

In the illustrated embodiment of FIG. 6B, search journal input box 5022 and save entry affordance 5024 belong to a set of native user interface elements that are displayed in native region 5020. The user interacts with search journal input box 5022 to search previous journal entries written by the user and interacts with save journal affordance 5024 to save the current journal entry. Although FIG. 6B illustrates displaying two native user interface elements in native region 5020, in some embodiments, a different number of native user interface elements are displayed in native region 5020.

In the illustrated embodiment of FIG. 6B, journal title input box 5012, journal note input box 5014, and mood slider 5016 belong to a set of virtual user interface elements that are displayed in virtualized region 5010. Further, the user interacts with journal title input box 5012 to input a journal entry's title, interacts with journal note input box 5014 to enter the journal entry's narrative, and interacts with mood slider 5016 to indicate the user's mood at the time of the journal entry. Although FIG. 6B illustrates displaying three virtual user interface elements in virtualized region 5010, in some embodiments, a different number of virtual user interface elements are displayed in virtualized region 5010.

In the illustrated embodiment of FIG. 6B, journal title input box 5012, journal note input box 5014, mood slider 5016, search journal input box 5022, and save entry affordance 5024 are user selectable user interface elements that the user selects by performing certain user inputs. Examples of such user inputs include a press gesture on a "tab" key, a press gesture on a "enter" key, a press gesture on an arrow key (such as a "↑" key a "↓," key, a "→" key, a "←" key, etc.), a press gesture on the track pad while a cursor, such as cursor 5102 is displayed over a user interface element, or another suitable user input for selecting user interface elements that are displayed in user interface 5002. In one embodiment, a default user interface element (such as journal title input box 5012) is initially selected by device 100 without any user input. In the illustrated embodiment, journal title input box 5012 is the currently selected user interface element. Device 100, in response to detecting a user input to select a user interface element, or after selecting a default user interface element, designates focus on the selected user interface element and displays an indication of focus on the selected user interface element. As used herein, an indication of focus on a user interface element is a visual indication that the user interface element is the currently selected user interface element (e.g., focus is on the user interface element). In the illustrated embodiment of FIG. 6B, an indication of focus is displayed on journal title input box 5012 to provide a visual indication that journal title input box 5012 has been selected. In the illustrated embodiment, the indication of focus includes a focus ring around journal title input box 5012 and a blinking cursor on the input field of journal title input box 5012. In an alternative embodiment illustrated in FIG. 6B', the indication of focus includes highlighting the input field of journal title input box 5012, in addition to displaying a blinking cursor on the input field and a focus ring around journal title input box 5012. Additional examples of the indication of focus include, but are not limited to, displaying the focus ring without the blinking cursor, displaying the blinking cursor without the focus ring, highlighting the selected user interface element, displaying content next to the selected user interface element to indicate that the user interface element is the selected user interface element, displaying an animation around the selected user interface element, or other suitable visual indications that the user interface element has been selected.

Figure 6C:
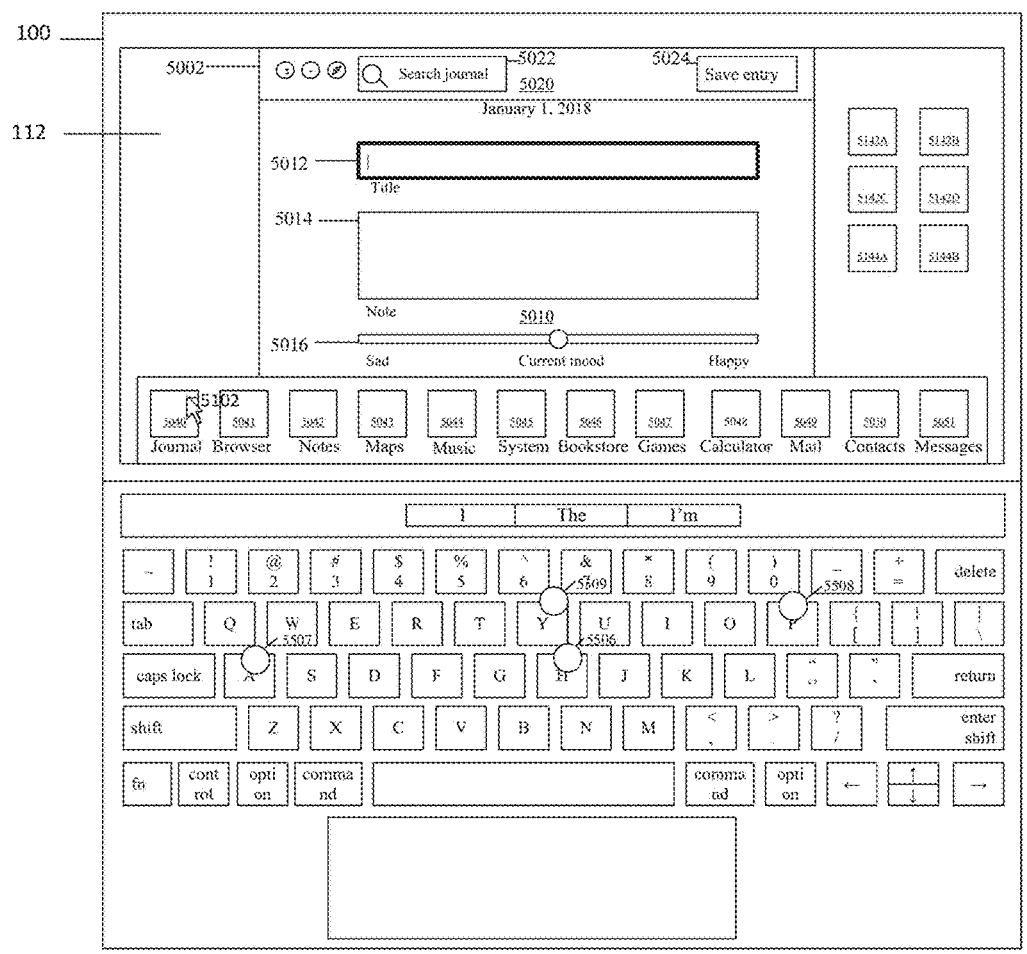

FIG. 6C illustrates displaying the indication of focus (blinking cursor and focus ring) on journal title input box 5012. In the illustrated embodiment, and while the indication of focus is on journal title input box 5012, the user enters the journal entry's title in journal title input box. In some embodiments, a virtual user interface element, such as journal title input box 5012, is only selectable by the user if the indication of focus is displayed on journal title input box 5012. In one or more of such embodiments, content in the title input field of journal title input box 5012 is only selectable (or editable) if the indication of focus is displayed on journal title input box 5012. In one or more of such embodiments, content in the title input field of journal title input box 5012 is greyed out if the indication of focus is not on journal title input box 5012. Similarly, in some embodiments, mood slider 5016 is not selectable by the user unless the indication of focus is displayed on mood slider 5016.

Figure 6D:
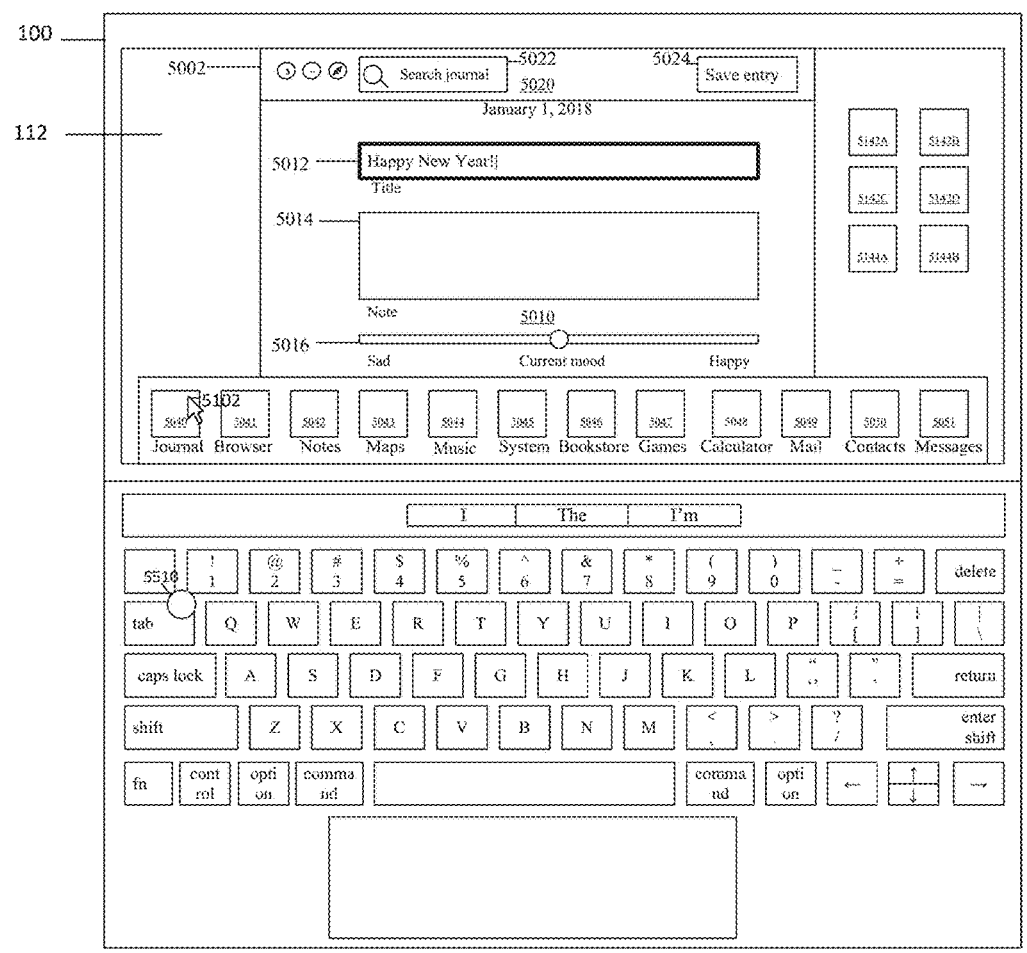

FIGS. 6C-6D illustrate detecting press gestures with contacts 5506-5509 over several keys of the keyboard to enter the title of the journal entry, and in response to detecting the press gestures and additional press gestures not shown in FIG. 6C, displaying "Happy New Year!" in journal title input box 5012. In the illustrated embodiment, the blinking cursor is on the title input field of journal title input box 5012 and the focus ring (the blinking cursor and the focus ring are collectively the indication of focus) is around journal title input box 5012, in each case to indicate that focus is on journal title input box 5012. Further, content entered by keyboard presses with contacts 5506-5509 on the keyboard are displayed in journal title input box 5012 of FIG. 6C. In some embodiments, content associated with other types of user inputs, such as voice dictation, mouse clicks (e.g., to paste content), or other suitable types of user inputs, are also entered in journal title input box 5012 while the indication of focus is on journal title input box 5012. After the user has entered an appropriate title for the journal entry, the user performs certain gestures, such as another press gesture on the tab key, to select another user interface element that is displayed in user interface 5002.

Figure 6E:
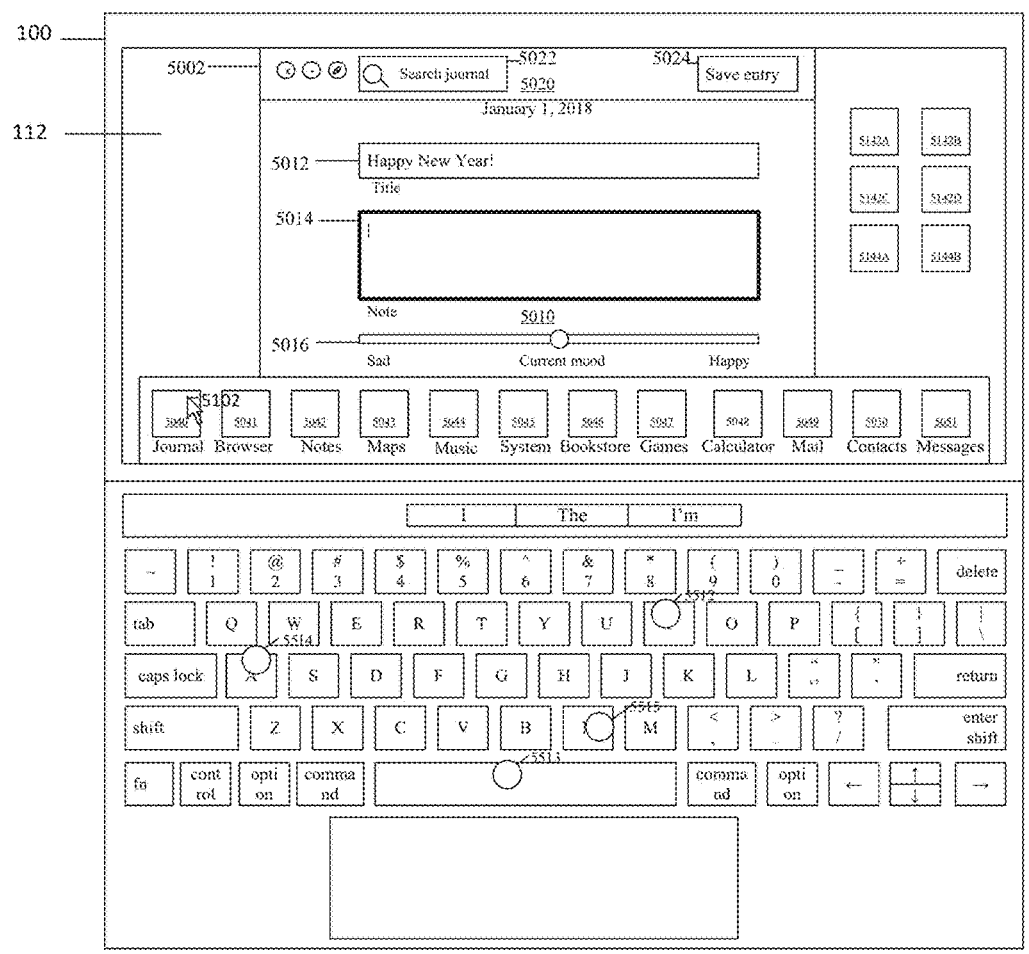

FIGS. 6D-6E illustrate detecting a press gesture with contact 5510 on tab key, and in response to the press gesture, removing the blinking cursor and the focus ring (the blinking cursor and the focus ring are collectively the indication of focus) from journal title input box 5012, and displaying the indication of focus on journal note input box 5014. Device 100, in response to detecting the user input with contact 5510 on the tab key as illustrated in FIG. 6D, moves focus to the next virtual user interface element (journal note input box 5014) of the three virtual user interface elements, and displays the indication of focus on the next virtual user interface element. In one or more embodiments, device 100 also displays an animation of the removal of the blinking cursor and the focus ring around journal title input box 5012 to inform the user that the indication of focus has been removed from journal title input box 5012. In some embodiments, device 100 displays a notification notifying the user that the indication of focus has been removed from journal title input box 5012.

Figure 6F:
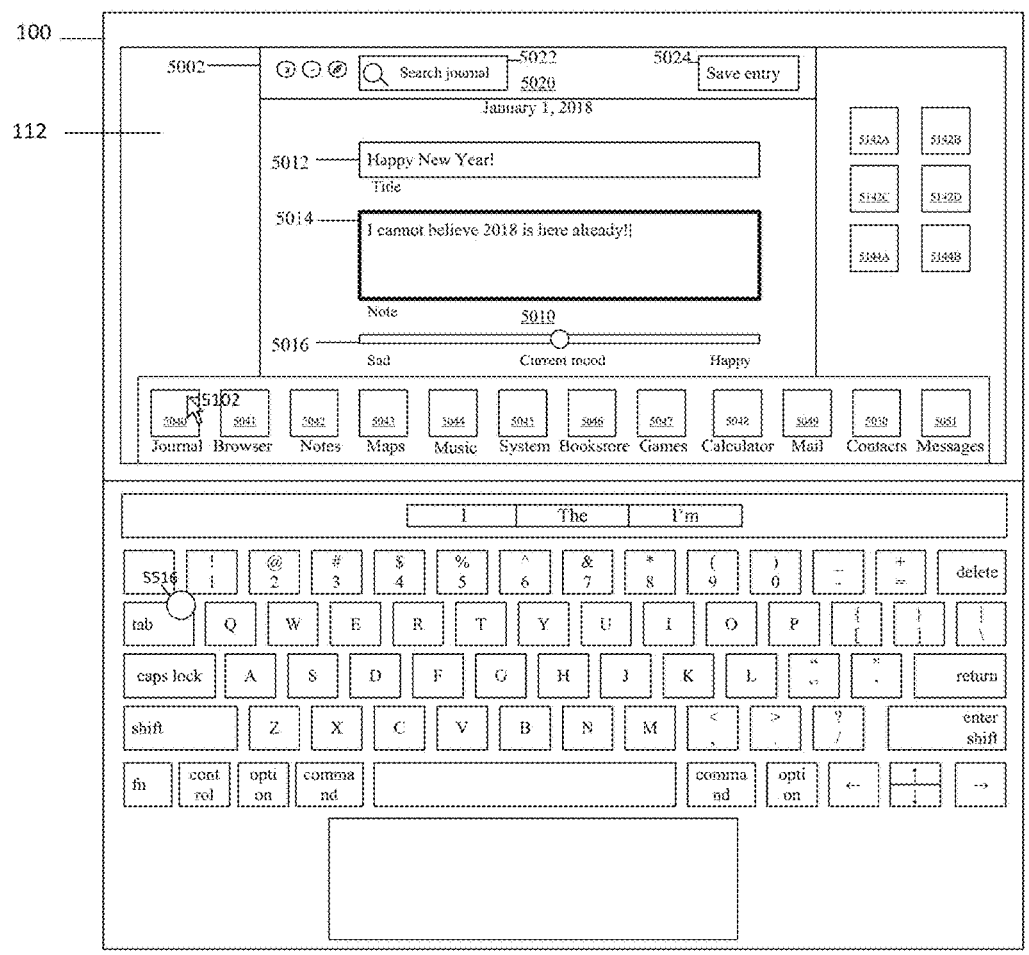
Figure 6G:
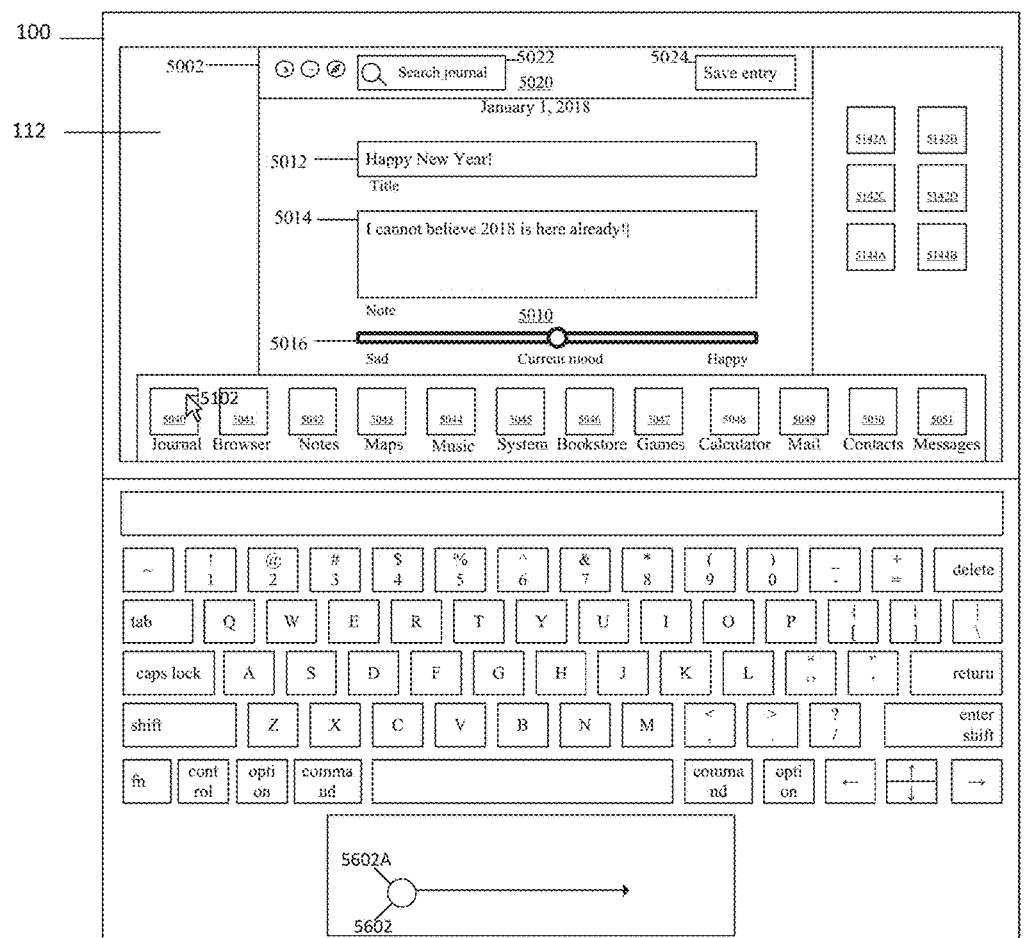

FIGS. 6E-6F illustrate detecting press gestures with contacts 5512-5515 over several keys of the keyboard to enter the title of the journal entry, and in response to detecting the press gestures, displaying a narrative in journal note input box 5014. After the user has entered a narrative, the user performs certain gestures, such as pressing the tab key again, to select another user interface element that is displayed in user interface 5002. In that regard, FIGS. 6F-6G illustrate detecting a press gesture with contact 5516 on the tab key, and in response to the press gesture, removing the blinking cursor and the focus ring (the indication of focus) from journal note input box 5014, and displaying a focus ring (the indication of focus) around mood slider 5016. In the illustrated embodiment, mood slider 5016 is the third and last virtual user interface element of the three virtual user interface elements (journal title input box 5012, journal note input box 5014, and mood slider 5016) that are displayed in virtualized region 5010. Device 100, in response to detecting the user input with contact 5516 on the tab key as illustrated in FIG. 6F, selects mood slider 5016. Further, device 100, also removes the indication of focus from journal note input box 5014, and displays the indication of focus on mood slider 5016 to indicate that focus is on mood slider 5016. In some embodiments, the user optionally slides mood slider 5016 towards the "sad" direction or towards the "happy" direction to indicate the current mood of the user after focus is on mood slider 5016.

Figure 6H:
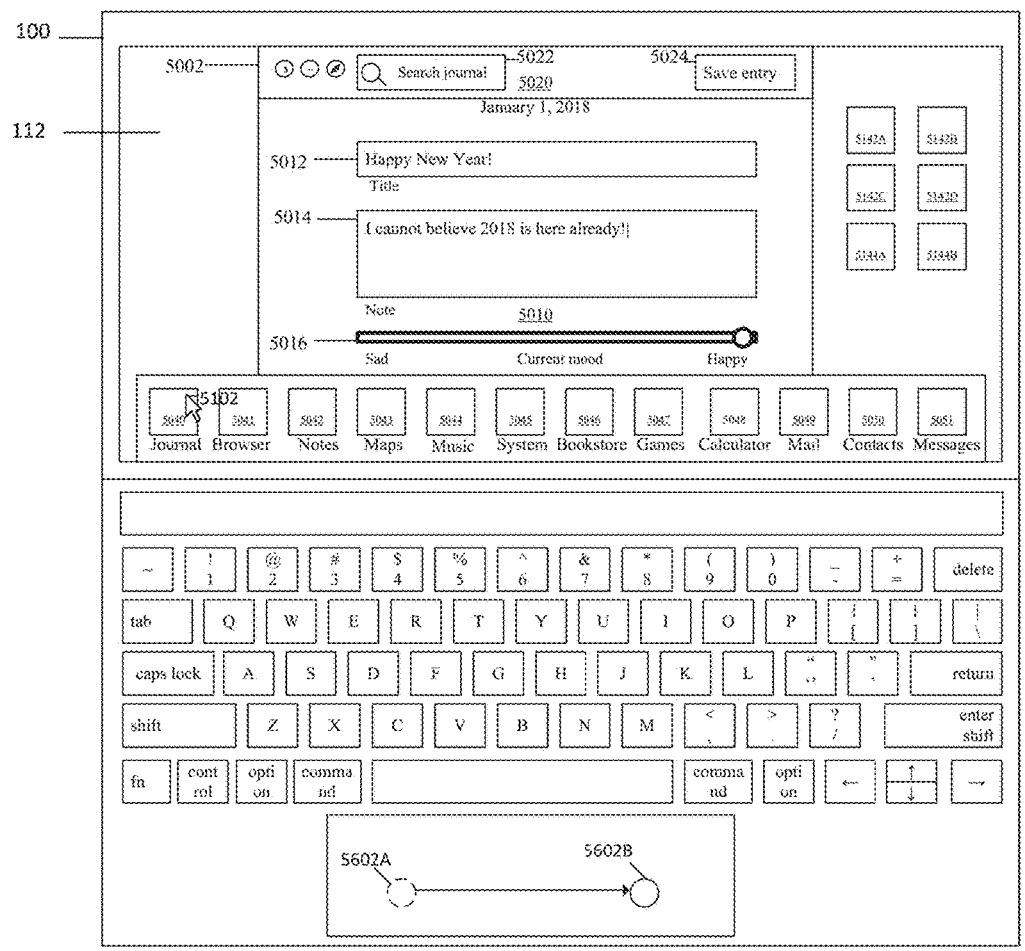

FIGS. 6G-6H illustrate detecting a swipe gesture with contact 5602 from position 5602A to position 5602B, followed by a press gesture on the trackpad at position 5604B, and in response to the swipe and press gestures, displaying a change in mood slider 5016 to indicate that the user is in a happy mood. In some embodiments, mood slider 5016 is replaced by one or more mood affordances (buttons) that the user interacts with to indicate the user's current mood. In one or more of such embodiments, mood slider 5016 is replaced by a happy affordance, a mad affordance, and a sad affordance. The user selects one of the three affordances to indicate the user's current mood. In such embodiments, the indication of focus is displayed on the selected mood affordance. In one or more embodiments, a different number of user selectable mood affordances (e.g., excited affordance, angry affordance, scared affordance, etc.) are displayed in virtualized region 5010. In some embodiments, mood slider 5016 is replaced by a mood menu (not shown) that displays different mood selections after the user has selected the mood menu.

Figure 6I:
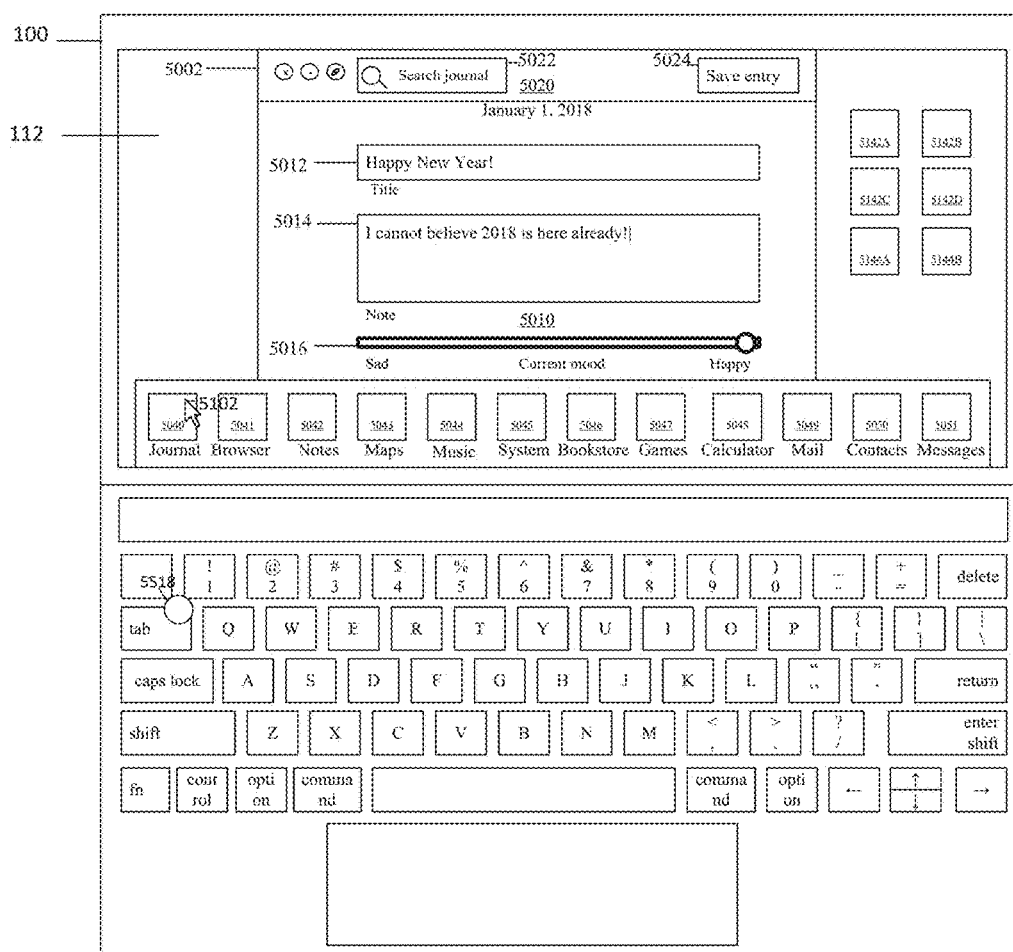
Figure 6J:
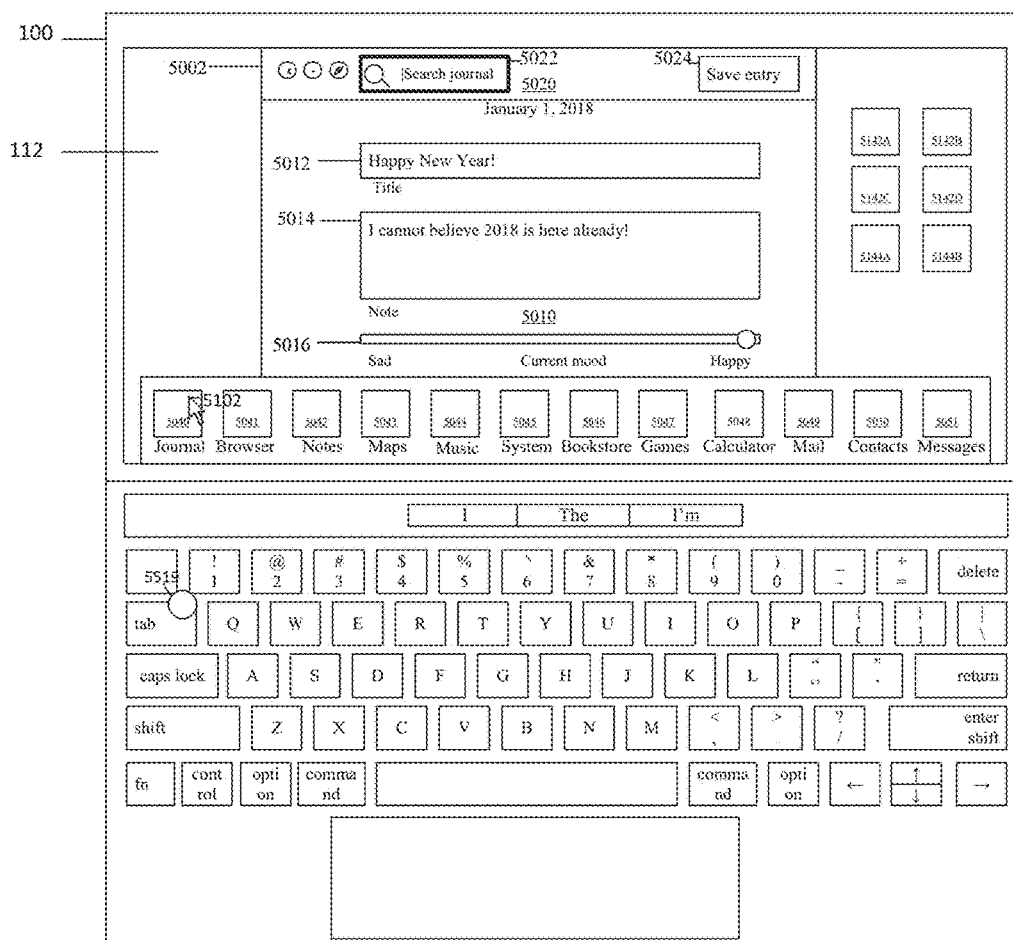

Once the user has selected a current mood of the user, the user will, in some circumstances, select a different user interface element, such as search journal input box 5022 to search a previous journal entry or save entry affordance 5024 to save the current entry. In embodiment illustrated in FIG. 6I, the user performs another press gesture on the tab key while the indication of focus is on mood slider 5016 to select a different user interface element. FIGS. 6I-6J illustrate detecting a press gesture with contact 5518 on the tab key, and in response to detecting the gesture, removing the focus ring (the indication of focus) from mood slider 5016, and displaying a blinking cursor on the search field of search journal input box 5022 and a focus ring (the blinking cursor and the focus ring are collectively the indication of focus) around search journal input box 5022. In the illustrated embodiment, a user input to move focus to another user interface element (e.g., press gesture on the tab key) while focus is on the last virtual user interface element (mood slider 5016), causes device 100 to select the first native user interface element (search journal input box 5022). Further, device 100, in response to detecting the user input to move focus to another user interface while the last virtual user interface element is selected, removes the indication of focus from the last virtual user interface element, and displays the indication of focus on the first native user interface element.

While focus is on search journal input box 5022 of FIG. 6J, the user will, in some circumstances, enter content into the search field to search for prior journal entries. In some embodiments, a native user interface element, such as search journal input box 5022, is only selectable by the user if the indication of focus (e.g., the blinking cursor and the focus ring) is displayed on search journal input box 5022. In one or more of such embodiments, content in the search field of search journal input box 5022 is only selectable (or editable) if the indication of focus is displayed on search journal input box 5022. In one or more of such embodiments, the search field of search journal input box 5022 is greyed out if the indication of focus is not on search journal input box 5022. In some embodiments, while a native user interface element, such as search journal input box 5022 is selected, the virtualized region, such as virtualized region 5010 is displayed as an inactive region. In one or more of such embodiments, journal title input box 5012, journal note input box 5014, and mood slider 5016 are not selectable by the user while the virtualized region is inactive. For example, while search journal input box 5022 is selected, a drag gesture performed over mood slider 5016 would not cause device 100 to display a different mood.

Figure 6K:
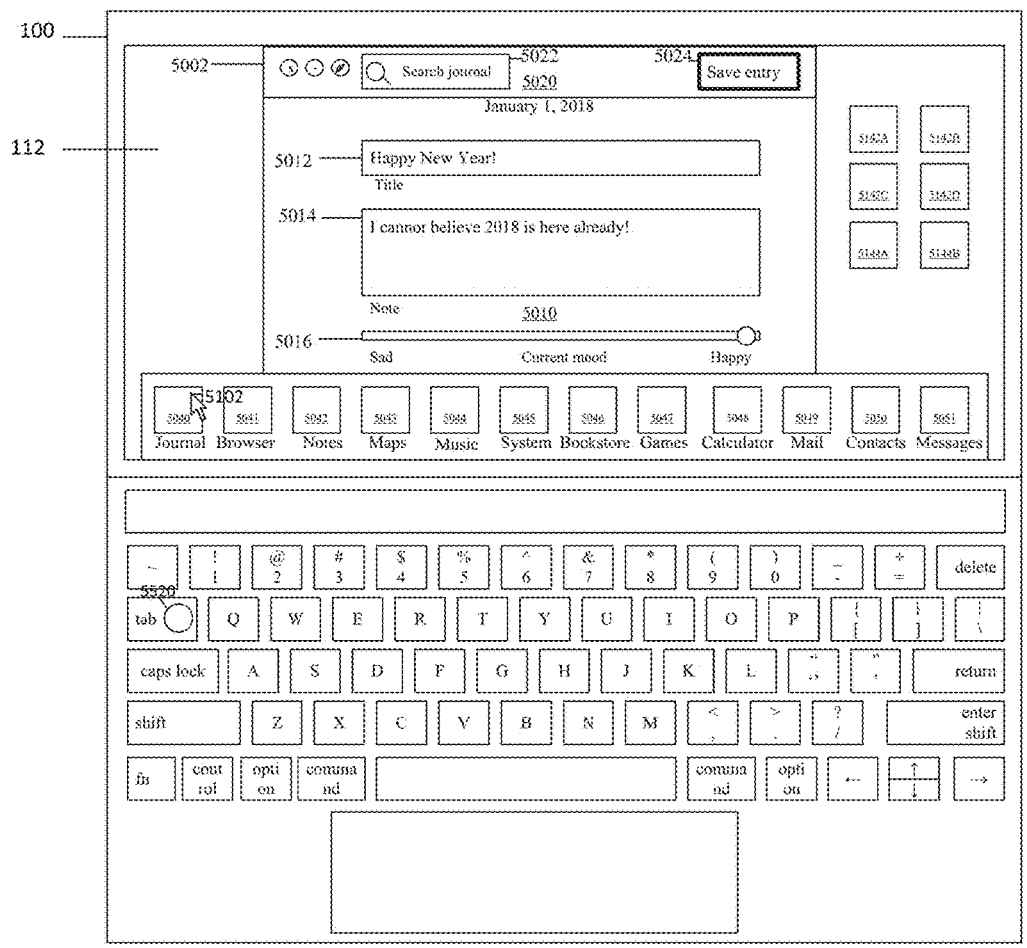

FIG. 6J-6K illustrate detecting a press gesture with contact 5519 on the tab key, and in response to detecting the press gesture, removing the blinking cursor and the focus ring (the blinking cursor and the focus ring are collectively the indication of focus) from search journal input box 5022, and displaying a focus ring (the indication of focus) around save entry affordance 5024. In one or more embodiments, device 100 also displays an animation of the removal of the blinking cursor and the focus ring around search journal input box 5022 to inform the user that the indication of focus has been removed from search journal input box 5022. In some embodiments, device 100 displays a notification notifying the user that the indication of focus has been removed from search journal input box 5022.

Figure 6L:
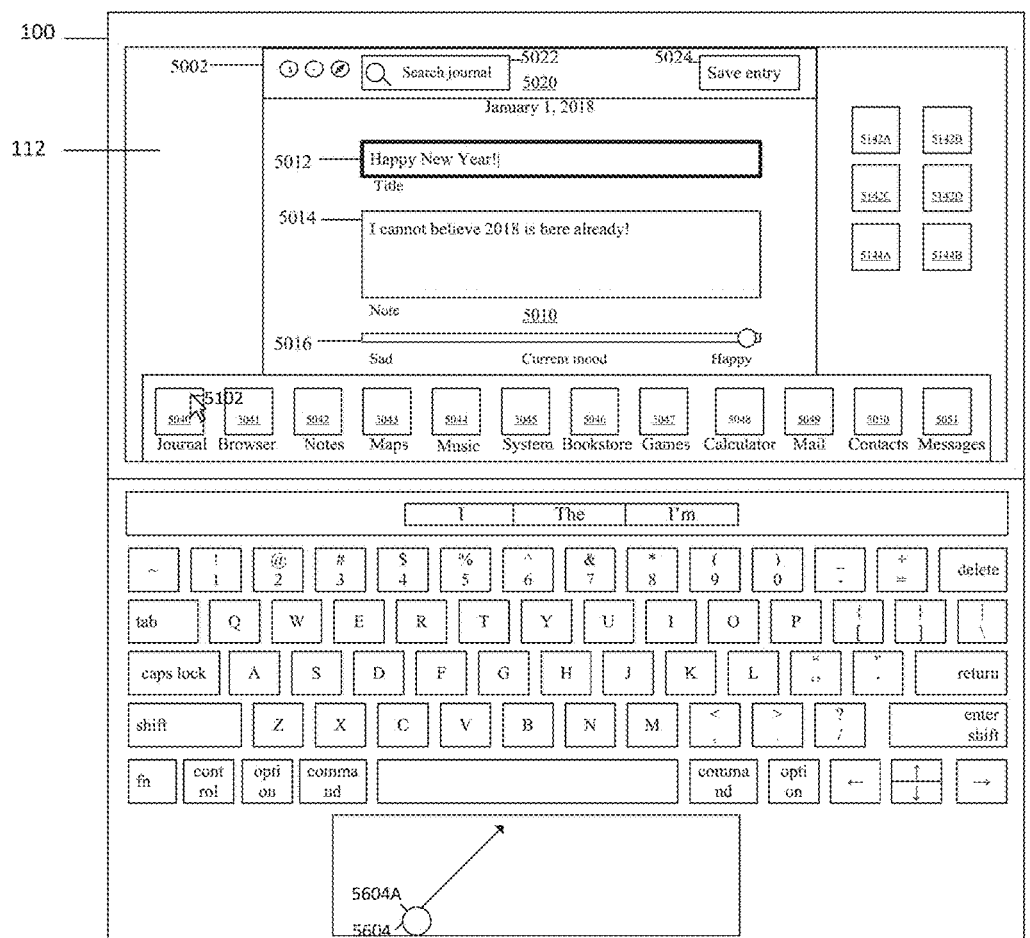

FIG. 6K-6L illustrate detecting a press gesture with contact 5520 on the tab key, and in response to detecting the press gesture, removing the blinking cursor and the focus ring (the blinking cursor and the focus ring are collectively the indication of focus) from save entry affordance 5024, and displaying the indication of focus on journal title input box 5012. In the illustrated embodiment, save entry affordance 5024 is the last native user interface element of two user interface elements that are displayed in native region 5020. Further, journal title input box 5012 is the first virtual user interface element of three virtual user interface elements that are displayed in virtualized region 5010.

In some embodiments, device 100, in response to certain user inputs, such as press gestures on the tab key, designates which user interface element to focus on based on a mode of the application (e.g., the journal application). In some embodiments, the mode of the application is pre-selected by device 100. In some embodiments, the mode of the application is designated by the user. In some embodiments, the mode of the application designates how focus is moved between native user interface elements and virtual user interface elements. In one or more embodiments, while the application operates on one mode, device 100 moves focus from the last virtual user interface element (e.g., mood slider 5016 of FIG. 6I) to the first native user interface element (e.g., search journal input box 5022 of FIG. 6J) in response to detecting a user input to select another user interface element. In one or more embodiments, while the application operates on another mode, device 100 moves focus from the last virtual user interface element to the first virtual user interface element (e.g., journal title input box 5012 of FIG. 6C) in response to detecting a user input to select another user interface element. In one or more embodiments, while the application operates on another mode, device 100 moves focus from the last virtual user interface element to a previous virtual user interface element (e.g., journal note input box 5014 of FIG. 6E) in response to detecting a user input to select another user interface element. In one or more embodiments, while the application operates on another mode, device 100 moves focus from the last native user interface element (e.g., save entry affordance 5024 of FIG. 6K) to the first virtual user interface element (e.g., journal title input box 5012 of FIG. 6L) in response to detecting a user input to select another user interface element. In one or more embodiments, while the application operates on another mode, device 100 moves focus from the last native user interface element to the first native user interface element (e.g., search journal input box 5022 of FIG. 6J) in response to detecting a user input to select another user interface element while focus is on the last native user interface element. In one or more embodiments, while the application operates on another mode, device 100 moves focus from the last native user interface element to a previous native user interface element in response to detecting a user input to select another user interface element.

In one or more embodiments, the application operates on additional modes that designate how to move focus between native user interface elements (e.g., from one native user interface element to the next native user interface element, from one native user interface element to the previous native user interface element, etc.) if a user input to select another user interface element is detected. In one or more embodiments, the application operates on additional modes that designate how to move focus between virtual user interface elements (e.g., from one virtual user interface element to the next virtual user interface element, from one virtual user interface element to the previous virtual user interface element, etc.) if a user input to select another user interface element is detected.

In some embodiments, certain modes of the application allow the user to perform different types of user inputs to move focus to different user interface elements. In one or more embodiments, while the application operates on one mode, device 100 moves focus from the last virtual user interface element (e.g., mood slider 5016 of FIG. 6I) to the first native user interface element (e.g., search journal input box 5022 of FIG. 6J) in response to detecting a first type of user input (e.g., press gesture on the tab key). Further, device 100 moves focus from the last virtual user interface element to the first virtual user interface element (e.g., journal title input box 5012 of FIG. 6C) in response to detecting a second type of user input (e.g., simultaneous press gestures on the shift key and the tab key). In one or more embodiments, while the application is operating on a similar mode, device 100 moves focus from the last native user interface to the first virtual user interface element or from the last native user interface element to the first native user interface element in response to detecting different types of user inputs. In one or more embodiments, while the application operates on one mode, device 100 moves focus from a virtual user interface element (e.g., journal note input box 5014 of FIG. 6E) to the next virtual user interface element (e.g., mood slider 5016 of FIG. 6G) in response to detecting a first type of user input. Further, device 100 moves focus from the virtual user interface element to the previous virtual user interface element (journal title input box 5012 of FIG. 6C) in response to detecting a second type of user input. In one or more embodiments, while the application is operating on a similar mode, device 100 moves focus from a native user interface element to a previous native user interface element or from the native user interface element to the next native user interface element in response to detecting different types of user inputs.

Figure 6M:
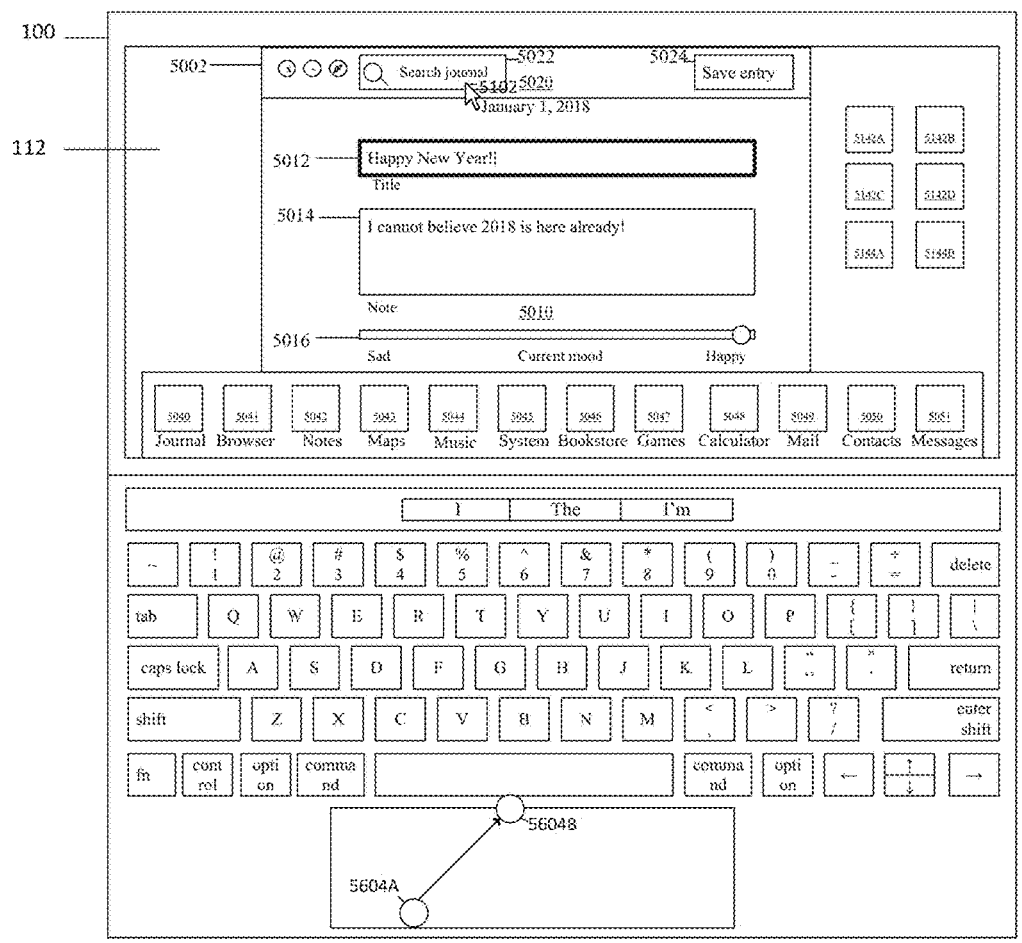
Figure 6N:
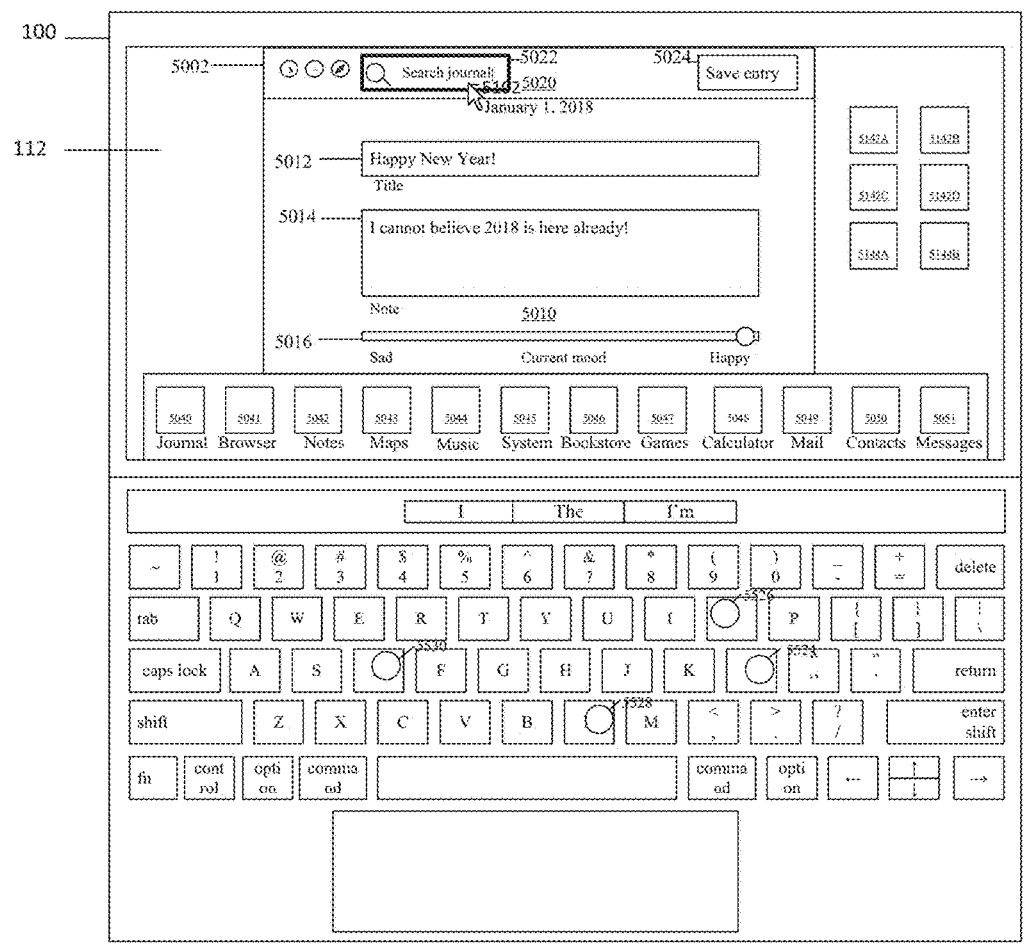
Figure 6O:
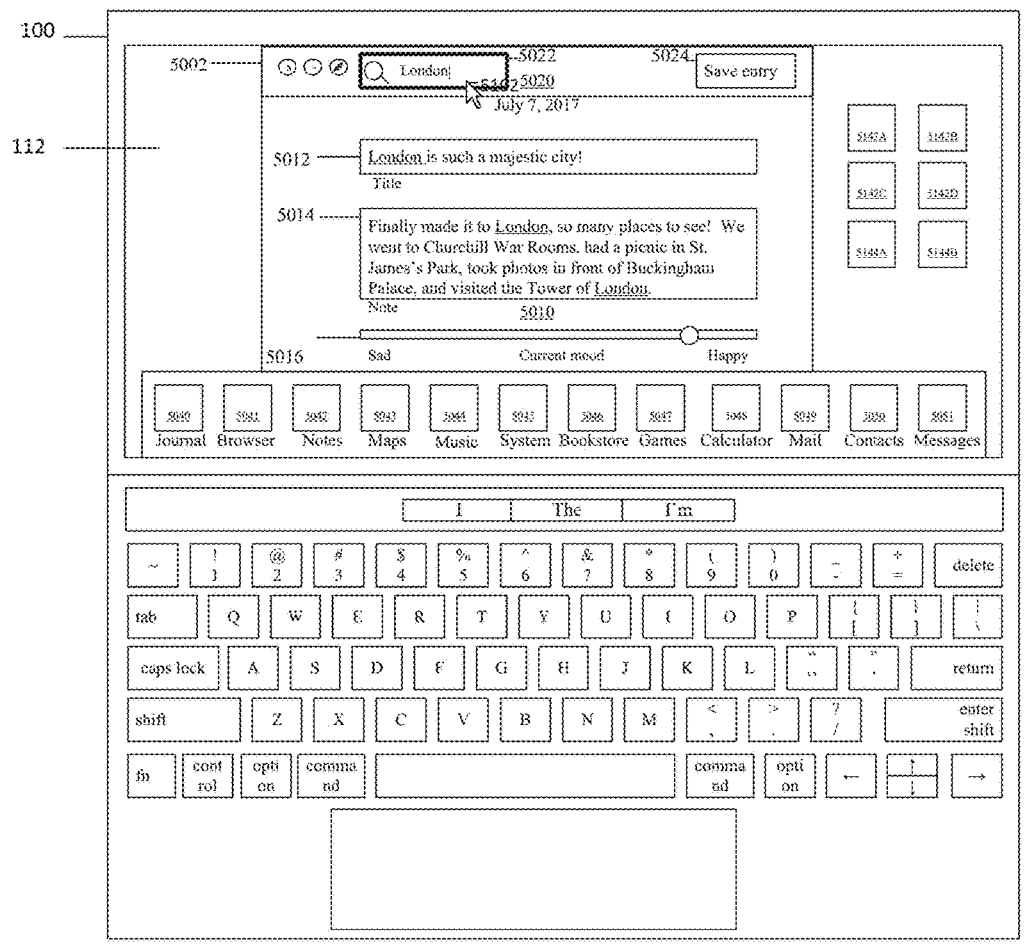

FIG. 6L illustrates displaying a blinking cursor on the title field of journal title input box 5012 and a focus ring (the blinking cursor and the focus ring are collectively the indication of focus) around journal title input box 5012. FIG. 6D-6L illustrate performing a series of five press gestures to move focus from journal title input box 5012 to journal note input box 5014, mood slider 5016, search journal input box 5022, save entry affordance 5024, and back to journal title input box 5012. In the illustrated embodiment, the user is able to continue to perform press gestures on the tab key to move focus to different user interface elements in the sequence illustrated in FIGS. 6D-6L to update the user's journal entry. Further, as described herein, the journal application optionally operates in different modes that designate which user interface element should be selected by device 100 in response to press gestures on the tab key. In the illustrated embodiment, the user also is able to scroll cursor 5102 over a user interface element, and perform a press gesture over the user interface element to select the user interface element. In that regard, FIGS. 6L-6M illustrate detecting a swipe gesture with contact 5604 from position 5604A to position 5604B, and in response to the swipe gesture, displaying movement of cursor 5102 from a location of display 112 over journal affordance 5040 to another location of display 112 over search journal input box 5022. FIG. 6M-6N illustrate detecting a press gesture on the trackpad at position 5604B, and in response to the press gesture, removing the indication of focus from journal title input box 5012, and displaying a blinking cursor on search field of search journal input box 5022 and a focus ring (the blinking cursor and the focus ring are collectively the indication of focus) around search journal input box 5022.

In the embodiment illustrated in FIG. 6N, focus is on search journal input box 5022. While focus is on search journal input box 5022, the user will, in some circumstances, enter one or more keywords to search prior journal entries or press the tab key again to move focus to save entry affordance 5024. In that regard, FIGS. 6N-6O illustrate detecting press gestures with contacts 5524, 5526, 5528, and 5530 over several keys of the keyboard to enter the keyword "London", and in response to detecting the press gestures, displaying a previous journal that includes the word "London" as the search result. In the illustrated embodiment, the title of the prior entry that contains the keyword "London" is displayed in journal title input box 5012, the narrative that contains the keyword "London" is displayed in journal note input box 5014, and the user's mood at the time the entry containing the keyword "London" was entered is indicated by mood slider 5016.

In the illustrated embodiment of FIG. 6O, the keyword "London" is underlined in journal title input box 5012 and journal note input box 5014. In some embodiments, the keyword is bolded, italicized, or highlighted to indicate the location of the keyword in the journal entry. In some embodiments, the user enters a different keyword to search the user's prior journal entries. Device 100, in response to determining that a prior journal entry contains the inputted keyword, displays the journal entry in virtualized region 5010. While search journal input box 5022 is selected, the user will, in some circumstances, perform another press gesture to select save entry affordance 5024, or perform multiple press gestures to select journal title input box 5012, journal note input box 5014, or mood slider 5016.

FIGS. 7A-7F are flow diagrams illustrating various embodiments of a method for moving focus between a virtualized region and a native region of a user interface that is displayed on device 100. More particularly, FIGS. 7A-7F are flow diagrams illustrating a method for moving focus between a virtualized region and a native region of a user interface running on device 100, using, for example, the user interfaces of FIGS. 6A-6O. As described in reference to FIGS. 6A-6O, method 700 can be utilized to move focus between a virtualized region and a native region of a user interface running on a device. Method 700 is performed at a device (e.g., device 100, 300, 500 illustrated in FIGS. 1, 3A, and 5A, respectively) with a display and one or more input devices. In one of such embodiments, the display is a touch screen display and the touch-sensitive surface is on or integrated with the display. In some embodiments, the display is separate from the touch-sensitive surface. In some embodiments, the processes described herein may be implemented with devices having physical user-interfaces, voice interfaces, or other suitable interfaces. Some operations in method 700 are, optionally, combined and/or the order of some operations is, optionally, changed.

As described below, method 700 provides an intuitive way to move focus between a virtualized region and a native region of a user interface that is displayed on device 100. Method 700 allows the user to move easily focus to different user interface elements displayed in both the virtualized and the native regions of the user interface. In such a manner, the user is able to use a common input that works in both the virtualized and native regions of a user interface to focus on different user interface elements when cycling between native and virtualize user interface elements. Method 700 thereby reduces the cognitive burden on the user to enter a respective type of user inputs to cycle between user interface elements displayed on native regions and on virtualized regions of a user interface that is displayed on device 100. Method 700 also allows virtual user elements and native user elements to be concurrently displayed in a common user interface, thereby creating a more efficient human-machine interface. For battery-operated computing devices, enabling a user to move focus between user interface elements displayed in virtualized and native regions, respectively, faster and more efficiently conserves power and increases the time between battery charges.

Device 100 displays (702) a user interface of an application that runs natively on the device, where the user interface includes a native region and a virtualized region. FIGS. 6B-6O for example, illustrate displaying user interface 5002 on display 112. Further, user interface 5002 includes native region 5020 and virtualized region 5010.

Device 100 concurrently displays (704) a first set of one or more native user interface elements in the native region and a second set of one or more virtual user interface elements in the virtualized region. FIGS. 6B-6O for example, illustrate displaying search journal input box 5022 and save entry affordance 5024. In the illustrated embodiments, search journal input box 5022 and save entry affordance 5024 are both native user interface elements that are displayed in native region 5020. FIGS. 6B-6O also illustrate displaying journal title input box 5012, journal note input box 5014, and mood slider 5016. In the illustrated embodiments, journal title input box 5012, journal note input box 5014, and mood slider 5016 are virtual user interface elements and are displayed in virtualized region 5010.

Device 100, while an indication of focus is on a user interface element of the first set of native user interface elements, detects (706), via the one or more input devices, a first user input of a respective type. FIGS. 6D, 6F, 6I, 6J, and 6K, for example, illustrate press gestures with contacts 5510, 5516, 5518, 5519, and 5520, respectively, on the tab key.

Device 100, in response to detecting the first user input while the indication of focus is on a user interface element of the first set of native user interface elements, removes (708) display of the indication of focus on the user interface element of the first set of native user interface elements. FIG. 6K, for example, illustrates displaying a focus ring (the indication of focus) around save entry affordance 5024, which is a native user interface element. Further, FIGS. 6K-6L illustrate detecting a press gesture with contact 5520 on the tab key, and in response to the press gesture, removing the focus ring from save entry affordance 5024.

Device 100, in accordance with a determination that the user interface element of the first set of native user interface elements is the last user interface element of the first set of native user interface elements, displays (710) the indication of focus on a first user interface element of the second set of virtual user interface elements. In the embodiments illustrated in FIGS. 6B-6O, save entry affordance 5024 is the last native user interface of two native user interface elements that are displayed in native region 5020. Further, journal title input box 5012 is the first virtual user interface element of three virtual user interface elements (which also include journal note input box 5014 and mood slider 5016) that are displayed in virtualized region 5010. FIGS. 6K-6L, for example, also illustrate detecting a press gesture with contact 5520 on the tab key, and in response to the press gesture, displaying a blinking cursor and a focus ring (the blinking cursor and the focus ring are collectively the indication of focus) around journal title input box 5012.

In some embodiments, device 100, in response to detecting the first user input while the indication of focus is on the last user interface element of the first set of native user interface elements, removes (712) display of the indication of focus on the last user interface element of the first set of native user interface elements. FIG. 6K, for example, illustrates displaying a focus ring (the indication of focus) around save entry affordance 5024, which is the last user interface element of the set of user interface elements that are displayed in native region 5020. Further, FIGS. 6K-6L illustrate detecting a press gesture with contact 5520 on the tab key, and in response to the press gesture, removing the focus ring around save entry affordance 5024. Removing display of the indication of focus on a user interface element after detecting a user interaction to select another user interface element allows the user to easily identify which user interface elements no longer selected by the user, thereby reducing the cognitive burden on the user. The foregoing also enhances the operability of the device and creates a more efficient human-machine interface. For battery-operated computing devices, enabling the user to identify which user interface elements are or are not selected faster and more efficiently conserves power and increases the time between battery charges.

In some embodiments, device 100, in response to detecting the first user input while the indication of focus is on the last user interface element of the first set of native user interface elements, removes (714) display of the indication of focus on the last user interface element of the first set of native user interface elements without displaying the indication of focus on other user interface elements of the one or more user interface elements of the first set of native user interface elements. FIGS. 6K-6L, for example, illustrate detecting a press gesture with contact 5520 on the tab key, and in response to the press gesture, removing the focus ring (the indication of focus) from save entry affordance 5024, which is the last user interface element of the set of user interface elements that are displayed in native region 5020. Moreover, neither the focus ring nor any other indication of focus is displayed on search journal input box 5022, which is the other native user interface element that is displayed in native region 5020. Removing the indication of focus from a native user interface element allows the user to quickly identify that focus is no longer on the native user interface element, thereby reducing the cognitive burden on the user. Moreover, not displaying the indication of focus on any of the native user interface elements allows the user to quickly determine that focus is not on any of the native user interface elements, thereby reducing the cognitive burden on the user. The foregoing also enhances the operability of the device and creates a more efficient human-machine interface. For battery-operated computing devices, enabling the user to identify which user interface element the indication of focus is on faster and more efficiently conserves power and increases the time between battery charges.

Device 100, while the indication of focus is on a user interface element of the second set of virtual user interface elements, detects (716), via the one or more input devices, a second user input of the respective type. FIG. 6I, for example, illustrates detecting a press gesture with contact 5518 on the tab key, while a focus ring (the indication of focus) is around mood slider 5016, which is a virtual user interface element.

Device 100, in response to detecting the second user input while the indication of focus is on a user interface element of the second set of virtual user interface elements, removes (718) display of the indication of focus on the user interface element of the second set of virtual user interface elements. FIG. 6I, for example, illustrates displaying a focus ring (the indication of focus) around mood slider 5016, which is a virtual user interface element. Further, FIGS. 6I-6J illustrate detecting a press gesture with contact 5518 on the tab key, and in response to the press gesture, removing the focus ring from mood slider 5016.

Device 100, in accordance with a determination that the user interface element of the second set of virtual user interface elements is the last user interface element of the second set of virtual user interface elements, displays (720) the indication of focus on a first user interface element of the first set of native user interface elements. In the embodiments illustrated in FIGS. 6B-6O, mood slider 5016, is the last virtual user interface element of three virtual user interface elements (which also include journal title input box 5012 and journal note input box 5014) that are displayed in virtualized region 5010. Further, search journal input box 5022 is the first native user interface element of two native user interface elements that are displayed in native region

5020. FIGS. 6I-6J, for example, illustrate detecting a press gesture with contact 5518 on the tab key while a focus ring (the indication of focus) is displayed around mood slider 5016, and in response to the press gesture, displaying a blinking cursor and a focus ring (the indication of focus) around search journal input box 5022.

In some embodiments, device 100, while the indication of focus is on a user interface element of the first set of native user interface elements, in response to detecting the first user input, and in accordance with a determination that the user interface element of the first set of native user interface elements is not the last user interface element of the first set of native user interface elements, displays (722) the indication of focus on another user interface element of the first set of native user interface elements. FIG. 6J, for example, illustrates displaying a blinking cursor and a focus ring (the indication of focus) around search journal input box 5022, which is the first native user interface element of native user interface elements displayed in native region 5020. Further, FIGS. 6J-6K, illustrate detecting a press gesture with contact 5519 on the tab key while the indication of focus is on search journal input box 5022, and in response to detecting the press gesture, displaying a focus ring (the indication of focus) around save entry affordance 5024.

In some embodiments, device 100, while the indication of focus is on a user interface element of the second set of virtual user interface elements, in response to detecting the second user input, and in accordance with a determination that the user interface element of the second set of virtual user interface elements is not the last user interface element of the second set of virtual user interface elements, displays (722) the indication of focus on another interface element of the second set of virtual user interface elements. FIG. 6D, for example, illustrates displaying a blinking cursor and a focus ring (the indication of focus) around journal title input box 5012, which is the first virtual user interface element of three virtual user interface elements displayed in virtualized region 5010. Further, FIGS. 6D-6E, illustrate detecting a press gesture with contact 5510 on the tab key while the indication of focus is on journal title input box 5012, and in response to detecting the press gesture, displaying a blinking cursor and a focus ring (the indication of focus) around journal note input box 5014. Removing the indication of focus on a native user interface element and displaying the indication of focus on another native user interface element in response to a user input allows the user to input a type of input (such as by pressing a tab key) to move focus to different native user elements that are displayed in the native region, thereby reducing the cognitive burden on the user. Similarly, removing the indication of focus on a virtual user interface element and displaying the indication of focus on another virtual user interface element in response to a user input allows the user to input a type of input to move focus between different virtual user elements that are displayed in the virtualized region, thereby also reducing the cognitive burden on the user. The foregoing also enhances the operability of the device and creates a more efficient human-machine interface. For battery-operated computing devices, enabling the user to enter a type of user input to cycle focus between different native user elements or different virtual user elements faster and more efficiently conserves power and increases the time between battery charges.

In some embodiments, device 100, while the indication of focus is on a user interface element of the first set of native user interface elements detects (724), via the one or more input devices, a third user input of the respective type. FIG. 6J, for example, illustrates displaying a focus ring (the indication of focus) around search journal input box 5022, which is a native user interface element. FIG. 6J also illustrates a press gesture with contact 5519 on the tab key.

In some embodiments, device 100, in response to detecting the third user input while the indication of focus is on the user interface element of the first set of native user interface elements, removes (724) display of the indication of focus on the user interface element of the first set of native user interface elements. FIG. 6J, for example, illustrates displaying a blinking cursor and a focus ring (the indication of focus) around search journal input box 5022. Further, FIGS. 6J-6K, illustrate detecting a press gesture with contact 5519 on the tab key while the indication of focus is on search journal input box 5022, and in response to detecting the press gesture, removing the blinking cursor and the focus ring around search journal input box 5022.

In some embodiments, device 100, in accordance with a determination that the user interface element of the first set of native user interface elements is not the last user interface element of the first set of native user interface elements, displays (724) the indication of focus on a next user interface element of the first set of native user interface elements. FIG. 6J, for example, illustrates displaying a blinking cursor and a focus ring (the indication of focus) around search journal input box 5022, which is the first native user interface element of native user interface elements displayed in native region 5020. Further, FIGS. 6J-6K, illustrate detecting a press gesture with contact 5519 on the tab key while the indication of focus is on search journal input box 5022, and in response to detecting the press gesture, displaying a focus ring (the indication of focus) around save entry affordance 5024, which is the next user interface element of the user interface elements that are displayed in native region 5020.

In some embodiments, device 100, while the indication of focus is on a user interface element of the second set of virtual user interface elements, detects (724), via the one or more input devices, a fourth user input of the respective type. FIG. 6D, for example, illustrates displaying a blinking cursor and a focus ring around journal title input box 5012, which is a virtual user interface element. FIG. 6D, for example, illustrates displaying a press gesture with contact 5510 on the tab key.

In some embodiments, device 100, in response to detecting the fourth user input while the indication of focus is on the user interface element of the second set of virtual user interface elements, removes (724) display of the indication of focus on the user interface element of the second set of virtual user interface elements. FIG. 6D, for example, illustrates displaying a blinking cursor and a focus ring (the indication of focus) around journal title input box 5012. Further, FIGS. 6D-6E, illustrate detecting a press gesture with contact 5510 on the tab key while the indication of focus on journal title input box 5012, and in response to detecting the press gesture, removing the blinking cursor and the focus ring around journal title input box 5012 and displaying a blinking cursor and a focus ring (the indication of focus) around journal note input box 5014.

In some embodiments, device 100, in accordance with a determination that the user interface element of the second set of virtual user interface elements is not the last user interface element of the second set of virtual user interface elements, displays (724) the indication of focus on a next user interface element of the second set of virtual user interface elements. FIG. 6D, for example, illustrates displaying a blinking cursor and a focus ring (the indication of focus) around journal title input box 5012. In the illustrated embodiment, journal title input box 5012, journal note input box 5014, and mood slider 5016 are the first, second, and third virtual user elements that are displayed in virtualized region 5010, respectively. Further, FIGS. 6D-6E, illustrate detecting a press gesture with contact 5510 on the tab key while the indication of focus on journal title input box 5012, and in response to detecting the press gesture, displaying a blinking cursor and a focus ring (the indication of focus) around journal note input box 5014.

Removing the indication of focus on a native user interface element and displaying the indication of focus on another native user interface element in response to a user input allows the user to input a type of input (such as by pressing a tab key) to easily move focus to different native user elements that are displayed in the native region, thereby reducing the cognitive burden on the user. Similarly, removing the indication of focus on a virtual user interface element and displaying the indication of focus on another virtual user interface element in response to a user input allows the user to easily move focus between different virtual user elements that are displayed in the virtualized region, thereby also reducing the cognitive burden on the user. The foregoing also enhances the operability of the device and creates a more efficient human-machine interface. For battery-operated computing devices, enabling the user to enter a type of user input to cycle focus between different native user elements or different virtual user elements faster and more efficiently conserves power and increases the time between battery charges.

In some embodiments, device 100, while the indication of focus is on a user interface element of the first set of native user interface elements, detects (726), via the one or more input devices, a third user input of the respective type. In some embodiments, device 100, in response to detecting the third user input while the indication of focus is on the user interface element of the first set of native user interface elements, removes (726) display of the indication of focus on the user interface element of the first set of native user interface elements. In some embodiments, device 100, in accordance with a determination that the user interface element of the first set of native user interface elements is the last user interface element of the first set of native user interface elements, displays (726) the indication of focus on a previous user interface element of the first set of native user interface elements. FIG. 6K, for example, illustrates displaying a focus ring (the indication of focus) around save entry affordance 5024, which is the last user interface element of the set of user interface elements that are displayed in native region 5020. Further, FIGS. 6K-6L illustrate detecting a press gesture with contact 5520 on the tab key, and in response to the press gesture, removing the focus ring around save entry affordance 5024. In the embodiment illustrated in FIGS. 6K-6L, a blinking cursor and a focus ring (the indication of focus) are displayed around journal title input box 5012 in response to the press gesture. In some embodiments, focus is moved to a previous native user interface element. In one or more of such embodiments, device 100 in response to detecting the press gesture with contact 5520 as illustrated in FIG. 6K, displays a blinking cursor and a focus ring (the indication of focus) around search journal input box 5022.

In some embodiments, device 100, while the indication of focus is on a user interface element of the second set of virtual user interface elements, detects (726), via the one or more input devices, a fourth user input of the respective type. In some embodiments, device 100, in response to detecting the fourth user input while the indication of focus is on the user interface element of the second set of virtual user interface elements, removes (726) display of the indication of focus on the user interface element of the second set of virtual user interface elements. In some embodiments, device 100, in accordance with a determination that the user interface element of the second set of virtual user interface elements is the last user interface element of the second set of virtual user interface elements, displays (726) the indication of focus on a previous user interface element of the second set of virtual user interface elements. FIG. 6I, for example, illustrates displaying a focus ring (the indication of focus) around mood slider 5016, which is the last user interface element of the set of virtual user interface elements that are displayed in virtualized region 5010. Further, FIGS. 6I-6J illustrate detecting a press gesture with contact 5518 on the tab key, and in response to the press gesture, removing the focus ring around mood slider 5016. In the embodiment illustrated in FIGS. 6I-6J, a blinking cursor and a focus ring (the indication of focus) are displayed around search journal input box 5022 in response to the press gesture. In some embodiments, focus is moved to a previous virtual user interface element. In one or more of such embodiments, device 100 in response to detecting the press gesture with contact 5518 as illustrated in FIG. 6I, displays a blinking cursor and a focus ring (the indication of focus) around journal note input box 5014, which is the second virtual user interface element. Removing the indication of focus on the last native user interface element and displaying the indication of focus on a previous native user interface element in response to a user input of a respective type (such as a press gesture on a tab key) allows the user to input one input of the respective type to move focus to a native user interface element that focus was previously on without having to cycle through other native or virtual user interface elements, thereby reducing the cognitive burden on the user. Similarly, removing the indication of focus on the last virtual user interface element and displaying the indication of focus on a previous virtual user interface element in response to a user input of a respective type allows the user to input one input to move focus to a virtual user interface element that focus was previously on without having to cycle through other native or virtual user interface elements. The foregoing also enhances the operability of the device and creates a more efficient human-machine interface. For battery-operated computing devices, enabling the user to move focus to a native user element focus was previously on or to a virtual user interface element focus was previously on faster and more efficiently conserves power and increases the time between battery charges.

In some embodiments, device 100, determines (728) a mode of the application. In some embodiments, device 100, in response to detecting a user input of the respective type, determines (728) whether to display the indication of focus on a user interface element of the first set of native user interface elements or a user interface element of the second set of virtual user interface elements based on the mode of the application. FIGS. 6E-6G and 6J-6L, for example, illustrate displaying the indication of focus on different user interface elements in response to detecting press gestures on the tab key. In some embodiments, device 100 determines which user interface element the indication of focus should be displayed on based on the mode of the application. Determining whether to display the indication of focus based on a mode of device 100 allows the user to select different variations of sequences of user interface elements to cycle focus between. The foregoing allows the user to designate a mode to display the indication of focus on user interface elements the user is interested in interacting with and not display the indication of focus on user interface elements the user is not interested in interacting with, thereby reducing the cognitive burden of the user and creating a more efficient human-machine interface. For battery-operated computer devices, enabling the user to interact with user interface elements the user is interested in interacting with faster and more efficiently conserves power and increases the time between battery charges.

In some embodiments, device 100, in response to detecting the first user input while the indication of focus is on a user interface element of the first set of native user interface elements, while the application is in a first mode, and in accordance with a determination that the user interface element of the first set of native user interface elements is the last user interface element of the first set of native user interface elements, displays (730) the indication of focus on the first user interface element of the second set of virtual user interface elements. FIG. 6K, for example, illustrates displaying a focus ring (the indication of focus) around save entry affordance 5024, which is the last native user interface element. FIGS. 6K-6L, for example, also illustrate detecting a press gesture with contact 5520 on the tab key, and in response to the press gesture, displaying a blinking cursor and a focus ring (the indication of focus) around journal title input box 5012, which is the first virtual user interface element. Displaying the indication of focus on the first virtual user interface element in response to detecting a user input while focus is displayed on the last native user interface element allows the user to easily determine that focus has moved from the last native user interface element to the first virtual user interface element, thereby reducing the cognitive burden on the user and creating a more efficient human-machine interface. Further, where the user desires to move focus from the last native user interface element to the first virtual user interface element, the user optionally selects the first mode to directly move focus from the last native user interface element to the first virtual user interface element, thereby creating a more efficient human-machine interface. For battery-operated computer devices, enabling the user to interact with user interface elements the user is interested in interacting with faster and more efficiently conserves power and increases the time between battery charges.

In some embodiments, device 100, in response to detecting the first user input while the indication of focus is on a user interface element of the first set of native user interface elements, while the application is in a second mode, and in accordance with a determination that the user interface element of the first set of native user interface elements is the last user interface element of the first set of native user interface elements, display (732) the indication of focus on the first user interface element of the first set of native user interface elements. In the embodiment illustrated in FIGS. 6K-6L, device 100, in response to detecting a press gesture with contact 5520 on the tab key, displays a blinking cursor and a focus ring (the indication of focus) around journal title input box 5012. In some embodiments, device 100, in response to detecting a press gesture as illustrated in FIG. 6K, displays a blinking cursor and a focus ring (the indication of focus) around search journal input box 5022, which is the first native user interface element. Displaying the indication of focus on the first native user interface element in response to detecting a user input while focus is displayed on the last native user interface element allows the user to easily determine that focus has moved from the last native user interface element to the first native user interface element, thereby reducing the cognitive burden on the user and creating a more efficient human-machine interface. Further, where the user desires to move focus from the last native user interface element to the first native user interface element, the user optionally selects the second mode to directly move focus from the last native user interface element to the first native user interface element, thereby creating a more efficient human-machine interface. For battery-operated computer devices, enabling the user to interact with user interface elements the user is interested in interacting with faster and more efficiently conserves power and increases the time between battery charges.

In some embodiments, device 100, in response to detecting the second user input while the indication of focus is on a user interface element of the second set of virtual user interface elements, while the application is in a third mode, and in accordance with a determination that the user interface element of the second set of virtual user interface elements is the last user interface element of the second set of virtual user interface elements, displays (734) the indication of focus on the first user interface element of the first set of native user interface elements. FIG. 6I, for example, illustrates displaying a focus ring (the indication of focus) around mood slider 5016, which is the last user interface element of the set of virtual user interface elements that are displayed in virtualized region 5010. Further, FIGS. 6I-6J illustrate detecting a press gesture with contact 5518 on the tab key, and in response to the press gesture, displaying a blinking cursor and a focus ring (the indication of focus) around search journal input box 5022, which is the first native user interface element. Displaying the indication of focus on the first native user interface element in response to detecting a user input while focus is displayed on the last virtual user interface element allows the user to easily determine that focus has moved from the last virtual user interface element to the first native user interface element, thereby reducing the cognitive burden on the user and creating a more efficient human-machine interface. Further, where the user desires to move focus from the last virtual user interface element to the first native user interface element, the user optionally selects the third mode to directly move focus from the last virtual user interface element to the first native user interface element, thereby creating a more efficient human-machine interface. For battery-operated computer devices, enabling the user to interact with user interface elements the user is interested in interacting with faster and more efficiently conserves power and increases the time between battery charges.

In some embodiments, device 100, in response to detecting the second user input while the indication of focus is on a user interface element of the second set of virtual user interface elements, while the application is in a fourth mode, and in accordance with a determination that the user interface element of the second set of virtual user interface elements is the last user interface element of the second set of virtual user interface elements, displays (736) the indication of focus on the first user interface element of the second set of virtual user interface elements. FIG. 6I, for example, illustrates displaying a focus ring (the indication of focus) around mood slider 5016, which is the last user interface element of the set of virtual user interface elements that are displayed in virtualized region 5010. In the embodiment illustrated in FIGS. 6I-6J illustrate device 100, in response to detecting a press gesture with contact 5518 on the tab key, displays a blinking cursor and a focus ring (the indication of focus) around search journal input box 5022, which is the first native user interface element. In some embodiments, device 100, in response to detecting a press gesture with contact 5518 as illustrated in FIG. 6I, displays a blinking cursor and a focus ring (the indication of focus) around journal title input box 5012, which is the first virtual user interface element.

Displaying the indication of focus on the first virtual user interface element in response to detecting a user input while focus is displayed on the last virtual user interface element allows the user to easily determine that focus has moved from the last virtual user interface element to the first virtual user interface element, thereby reducing the cognitive burden on the user and creating a more efficient human-machine interface. Further, where the user desires to move focus from the last virtual user interface element to the first virtual user interface element, the user optionally selects the fourth mode to directly move focus from the last virtual user interface element to the first virtual user interface element, thereby creating a more efficient human-machine interface. For battery-operated computer devices, enabling the user to interact with user interface elements the user is interested in interacting with faster and more efficiently conserves power and increases the time between battery charges.

In some embodiments, device 100, in response to detecting the second user input while the indication of focus is on the last user interface element of the second set of virtual user interface elements, removes (738) display of the indication of focus on the last user interface element of the second set of virtual user interface elements. FIG. 6I, for example, illustrates displaying a focus ring (the indication of focus) around mood slider 5016, which is the last user interface element of the set of virtual user interface elements that are displayed in virtualized region 5010. Further, FIGS. 6I-6J illustrate detecting a press gesture with contact 5518 on the tab key, and in response to the press gesture, removing the focus ring (the indication of focus) around mood slider 5016. Removing display of the indication of focus on a user interface element after detecting a user interaction to select another user interface element allows the user to easily identify which user interface elements are not selected by the user, thereby reducing the cognitive burden on the user. The foregoing also enhances the operability of the device and creates a more efficient human-machine interface. For battery-operated computing devices, enabling the user to identify which user interface elements are or are not selected faster and more efficiently conserves power and increases the time between battery charges.

In some embodiments, device 100, in response to detecting the second user input while the indication of focus is on the last user interface element of the second set of virtual user interface elements, removes (740) display of the indication of focus on the last user interface element of the second set of virtual user interface elements without displaying the indication of focus on other user interface elements of the one or more user interface elements of the second set of virtual user interface elements. FIG. 6I, for example, illustrates displaying a focus ring (the indication of focus) around mood slider 5016, which is the last user interface element of the set of virtual user interface elements that are displayed in virtualized region 5010. Further, FIGS. 6I-6J illustrate detecting a press gesture with contact 5518 on the tab key, and in response to the press gesture, removing the display of the focus ring (the indication of focus) around mood slider 5016. In the embodiment illustrated in FIGS. 6I-6J, device 100, in response to detecting the press gesture over contact 5518, does not display the indication of focus on journal title input box 5012 or journal note input box 5014. Removing the indication of focus from a virtual user interface element allows the user to quickly identify that focus is no longer on the virtual user interface element, thereby reducing the cognitive burden on the user. Moreover, not displaying the indication of focus on any of the virtual user interface elements allows the user to quickly determine that focus is not on any of the virtual user interface elements, thereby reducing the cognitive burden on the user. The foregoing also enhances the operability of the device and creates a more efficient human-machine interface. For battery-operated computing devices, enabling the user to identify which user interface element the indication of focus is on faster and more efficiently conserves power and increases the time between battery charges.

In some embodiments, device 100, while the indication of focus is not on any of the second set of virtual user interface elements, displays (742) the virtualized region as an inactive region of the application. FIG. 6J, for example, illustrates displaying a blinking cursor and a focus ring (the indication of focus) around search journal input box 5022, without displaying the indication of focus on journal title input box 5012, journal note input box 5014, or mood slider 5016, which are the three virtual user interface elements that are displayed in virtualized region 5010. In some embodiments, device 100, also displays an indication that virtualized region 5010 is an inactive region. Displaying the virtualized region as inactive allows the user to quickly determine that focus is not on any virtual user interface elements of the virtualized region, thereby reducing the cognitive burden on the user. The foregoing also enhances the operability of the device and creates a more efficient human-machine interface. For battery-operated computing devices, enabling the user to identify whether focus is on user interface elements in the virtualized region faster and more efficiently conserves power and increases the time between battery charges.

In some embodiments, device 100, in response to detecting the first user input while the indication of focus is on a user interface element of the first set of native user interface elements, displays (744) a first animation indicative of a removal of display of the indication of focus on the user interface element of the first set of native user interface elements. FIG. 6K, for example, illustrates displaying a focus ring (the indication of focus) around save entry affordance 5024, which is a native user interface element. Further, FIGS. 6K-6L illustrate detecting a press gesture with contact 5520 on the tab key, and in response to the press gesture, removing the focus ring from save entry affordance 5024. In some embodiments, device 100, in response to detecting the press gesture illustrated in FIG. 6K, also displays an animation indicative of the removal of the focus ring from save entry affordance 5024.

In some embodiments, device 100, in response to detecting the second user input while the indication of focus is on a user interface element of the second set of virtual user interface elements, displays (744) a second animation indicative of the removal of display of the indication of focus on the user interface element of the second set of virtual user interface elements. FIG. 6I, for example, illustrates displaying a focus ring (the indication of focus) around mood slider 5016, which is a virtual user interface element. Further, FIGS. 6I-6J illustrate detecting a press gesture with contact 5518 on the tab key, and in response to the press gesture, removing the focus ring from mood slider 5016. In some embodiments, device 100, in response to detecting the press gesture illustrated in FIG. 6I, also displays an animation indicative of the removal of the focus ring from mood slider 5016. Displaying an animation indicative of a removal of display of the indication of focus on a respective user interface element provides the user with a visual indication that focus is no longer on the respective user interface element, thereby reducing the cognitive burden on the user. The foregoing also enhances the operability of the device and creates a more efficient human-machine interface. For battery-operated computing devices, enabling the user to determine the removal of the indication of focus on the respective user interface element faster and more efficiently conserves power and increases the time between battery charges.

In some embodiments, the native region includes borders of the user interface of the application, and the virtualized region is an internal region of the native region (746). FIGS. 6B-6O, for example, illustrate concurrently displaying virtualized region 5010 and native region 5020 of user interface 5002. Further, native region 5020 includes the borders of user interface 5002, and virtualized region 5010 form an internal region of native region 5020. Displaying the virtualized region as an internal region of the native region allows both the native region and the virtualized region to be concurrently displayed on device 100, thereby reducing the cognitive burden on the user and creating a more efficient human-machine interface. Displaying the virtualized region as an internal region of the native region also allows the user to interact with user interface elements displayed in the native region and the virtualized region without transitioning to extraneous user interfaces, thereby reducing the cognitive burden on the user. For battery-operated computing devices, enabling the user to interact with user interface elements displayed in the native region and the virtualized region faster and more efficiently conserves power and increases the time between battery charges.

In some embodiments, device 100, detects (748) a first press gesture on a tab key of a keyboard that is communicatively connected to the electronic device, wherein the first user input is the first press gesture on the tab key. In some embodiments, device 100, detects (748) a second press gesture on the tab key of the keyboard, wherein the second user input is the second press gesture on the tab key. FIGS. 6D, 6F, 6I, 6J, and 6K, for example, illustrate press gestures with contacts 5510, 5516, 5518, 5519, and 5520 on the tab key. The method allows the user to perform a simple gesture to select a different user interface element, thereby reducing the cognitive burden on the user. Further, the method also allows the user to repeatedly perform the same gesture to cycle between different user interface elements, thereby also reducing the cognitive burden on the user. For battery-operated computing devices, enabling the user to select different user interface elements that are displayed in the native region and the virtualized region faster and more efficiently conserves power and increases the time between battery charges.

In some embodiments, device 100, in accordance with a determination that focus is on a user interface element of the first set of native user interface elements, displays (750) the indication of focus on the user interface element of the first set of native user interface elements. In some embodiments, device 100, in accordance with a determination that focus is not on the user interface element of the first set of native user interface elements, removes (750) display of the indication of focus on the user interface element of the first set of native user interface elements. FIG. 6J-6K, for example, illustrate, detecting a press gesture with contact 5519 over tab key, and in response to the press gesture, displaying a focus ring (the indication of focus) around save entry affordance 5024, which is the last native user interface element. In the illustrated embodiment, device 100, in response to detecting the press gesture, displays the focus ring around save entry affordance 5024. FIGS. 6K-6L, for example, also illustrate detecting a press gesture with contact 5520 on the tab key, and in response to the press gesture, removing the focus ring from save entry affordance 5024.

In some embodiments, device 100, in accordance with a determination that focus is on a user interface element of the second set of virtual user interface elements, displays (750) the indication of focus on the user interface element of the second set of virtual user interface elements. In some embodiments, device 100, in accordance with a determination that focus is not on the user interface element of the second set of virtual user interface elements, removes (750) display of the indication of focus on the user interface element of the second set of virtual user interface elements. FIGS. 6F-6G, for example, illustrate detecting a press gesture with contact 5516 on the tab key, and in response to detecting the press gesture, displaying a focus ring (the indication of focus) around mood slider 5016, which is a virtual user interface element. In the illustrated embodiment, device 100, in response to detecting the press gesture, displays the focus ring around mood slider 5016. FIGS. 6I-6J is a continuation of FIGS. 6F-6G. FIGS. 6I-6J illustrate detecting a press gesture with contact 5518 on the tab key, and in response to the press gesture, removing the focus ring from mood slider 5016. Displaying an indication of focus on a respective user interface element allows the user to identify that focus is on the respective user interface element, thereby reducing the cognitive burden on the user and creates a more efficient human-machine interface. Similarly, removing the indication of focus from being displayed on the respective user interface element allows the user to identify that focus is no longer on the respective user interface element, thereby reducing the cognitive burden on the user, and creates a more efficient human-machine interface. For battery-operated computing devices, enabling the user to identify which user interface element focus is currently on faster and more efficiently conserves power and increases the time between battery charges.

In some embodiments, device 100, while the indication of focus is on a user interface element of the first set of native user interface elements, displays (752) the user interface element as a selectable user interface element of the first set of native user interface elements. In some embodiments, device 100, while the indication of focus is not on the user interface element of the first set of native user interface elements, displays (752) the user interface element as a non-selectable user interface element of the first set of native user interface elements. FIG. 6K, for example, illustrates displaying a focus ring (the indication of focus) around save entry affordance 5024, which is a native user interface element. Further, FIGS. 6K-6L illustrate detecting a press gesture with contact 5520 on the tab key, and in response to the press gesture, removing the focus ring from save entry affordance 5024. In the illustrated embodiment, the user optionally selects save entry affordance 5024 to save the current journal entry. In some embodiments, save entry affordance 5024 is not selectable by the user if the focus ring is not displayed around save entry affordance 5024.

In some embodiments, device 100, while the indication of focus is on a user interface element of the second set of virtual user interface elements, displays (752) the user interface element as a selectable user interface element of the second set of virtual user interface elements. In some embodiments, device 100, while the indication of focus is not on the user interface element of the second set of virtual user interface elements, displays (752) the user interface element as a non-selectable user interface element of the second set of virtual user interface elements. FIG. 6G, for example, illustrates displaying a focus ring (the indication of focus) around mood slider 5016. FIGS. 6G-6H illustrate detecting a swipe gesture with contact 5602 from position 5602A to position 5602B, and in response to the swipe gesture, displaying a change in mood slider 5016 to indicate that the user is in a happy mood. In some embodiments, mood slider 5016 is not selectable by the user if the focus ring is not displayed around mood slider 5016. Displaying a respective user interface element as a selectable user interface element allows the user to identify that focus is on the respective user interface element, thereby reducing the cognitive burden on the user and creates a more efficient human-machine interface. Similarly, displaying the user interface element as a non-selectable user interface element allows the user to identify that focus is no longer on the respective user interface element, thereby reducing the cognitive burden on the user, and creates a more efficient human-machine interface. For battery-operated computing devices, enabling the user to identify which user interface element focus is currently on faster and more efficiently conserves power and increases the time between battery charges.

The particular order in which the operations in FIGS. 7A-7F have been described is merely exemplary and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:
   at an electronic device with a display and one or more input devices:
   displaying, on the display, a user interface of an application that runs natively on the device, wherein the user interface comprises a native region and a virtualized region, the virtualized region being a user interface region of the application that runs virtually on the electronic device;
   concurrently displaying a first set of one or more native user interface elements in the native region and a second set of one or more virtual user interface elements in the virtualized region;

determining a pre-selected mode of the application, wherein the mode of the application designates how to shift focus between user interface elements of the first set of one or more native user interface elements and the second set of one or more virtual user interface elements, and wherein different modes of the application designate different shift focus sequences between the user interface elements of the first set of one or more native user interface elements and the second set of one or more virtual user interface elements;

while an indication of focus is on a user interface element of the first set of native user interface elements, detecting, via the one or more input devices, a first user input of a respective type;

in response to detecting the first user input while the indication of focus is on a user interface element of the first set of native user interface elements:
  removing display of the indication of focus on the user interface element of the first set of native user interface elements; and
  in accordance with a determination that the user interface element of the first set of native user interface elements is the last user interface element of the first set of native user interface elements and based on the mode of the application, displaying the indication of focus on a first user interface element of the second set of virtual user interface elements; and while the indication of focus is on a user interface element of the second set of virtual user interface elements, detecting, via the one or more input devices, a second user input of the respective type;

in response to detecting the second user input while the indication of focus is on a user interface element of the second set of virtual user interface elements:
  removing display of the indication of focus on the user interface element of the second set of virtual user interface elements; and
  in accordance with a determination that the user interface element of the second set of virtual user interface elements is the last user interface element of the second set of virtual user interface elements and based on the mode of the application, displaying the indication of focus on a first user interface element of the first set of native user interface elements.

2. The method of claim 1, further comprising:
while the indication of focus is on a user interface element of the first set of native user interface elements,
  in response to detecting the first user input, and in accordance with a determination that the user interface element of the first set of native user interface elements is not the last user interface element of the first set of native user interface elements, displaying the indication of focus on another user interface element of the first set of native user interface elements; and
while the indication of focus is on a user interface element of the second set of virtual user interface elements,
  in response to detecting the second user input, and in accordance with a determination that the user interface element of the second set of virtual user interface elements is not the last user interface element of the second set of virtual user interface elements, displaying the indication of focus on another user interface element of the second set of virtual user interface elements.

3. The method of claim 1, further comprising:
while the indication of focus is on a user interface element of the first set of native user interface elements, detecting, via the one or more input devices, a third user input of the respective type;
  in response to detecting the third user input while the indication of focus is on the user interface element of the first set of native user interface elements:
    removing display of the indication of focus on the user interface element of the first set of native user interface elements; and
    in accordance with a determination that the user interface element of the first set of native user interface elements is not the last user interface element of the first set of native user interface elements, displaying the indication of focus on a next user interface element of the first set of native user interface elements; and
while the indication of focus is on a user interface element of the second set of virtual user interface elements, detecting, via the one or more input devices, a fourth user input of the respective type;
  in response to detecting the fourth user input while the indication of focus is on the user interface element of the second set of virtual user interface elements:
    removing display of the indication of focus on the user interface element of the second set of virtual user interface elements; and
    in accordance with a determination that the user interface element of the second set of virtual user interface elements is not the last user interface element of the second set of virtual user interface elements, displaying the indication of focus on a next user interface element of the second set of virtual user interface elements.

4. The method of claim 1, further comprising:
while the indication of focus is on a user interface element of the first set of native user interface elements, detecting, via the one or more input devices, a third user input of the respective type;
  in response to detecting the third user input while the indication of focus is on the user interface element of the first set of native user interface elements:
    removing display of the indication of focus on the user interface element of the first set of native user interface elements; and
    in accordance with a determination that the user interface element of the first set of native user interface elements is the last user interface element of the first set of native user interface elements, displaying the indication of focus on a previous user interface element of the first set of native user interface elements; and
while the indication of focus is on a user interface element of the second set of virtual user interface elements, detecting, via the one or more input devices, a fourth user input of the respective type;
  in response to detecting the fourth user input while the indication of focus is on the user interface element of the second set of virtual user interface elements:
    removing display of the indication of focus on the user interface element of the second set of virtual user interface elements; and in accordance with a determination that the user interface element of the second set of virtual user interface elements is the last user interface element of the second set of virtual user interface elements, displaying the indication of focus on a previous user interface element of the second set of virtual user interface elements.

5. The method of claim 1, further comprising:
in response to detecting a user input of the respective type, determining whether to display the indication of focus on a user interface element of the first set of native user interface elements or a user interface element of the second set of virtual user interface elements based on the mode of the application.

6. The method of claim 5, further comprising:
in response to detecting the first user input while the indication of focus is on a user interface element of the first set of native user interface elements:
while the application is in a first mode, and in accordance with a determination that the user interface element of the first set of native user interface elements is the last user interface element of the first set of native user interface elements, displaying the indication of focus on the first user interface element of the second set of virtual user interface elements.

7. The method of claim 6, wherein the indication of focus is displayed on the first user interface element of the second set of virtual user interface elements only in response to a determination that the user interface element of the first set of native user interface elements is the last user interface element of the first set of native user interface elements while the application is in the first mode, and further comprising:
in response to detecting the first user input while the indication of focus is on a user interface element of the first set of native user interface elements:
while the application is in a second mode, and in accordance with a determination that the user interface element of the first set of native user interface elements is the last user interface element of the first set of native user interface elements, displaying the indication of focus on the first user interface element of the first set of native user interface elements.

8. The method of claim 5, further comprising:
in response to detecting the second user input while the indication of focus is on a user interface element of the second set of virtual user interface elements:
while the application is in a third mode, and in accordance with a determination that the user interface element of the second set of virtual user interface elements is the last user interface element of the second set of virtual user interface elements, displaying the indication of focus on the first user interface element of the first set of native user interface elements.

9. The method of claim 8, wherein the indication of focus is displayed on the first user interface element of the first set of native user interface elements only in response to a determination that the user interface element of the second set of virtual user interface elements is the last user interface element of the second set of virtual user interface elements while the application is in the third mode, and further comprising:
in response to detecting the second user input while the indication of focus is on a user interface element of the second set of virtual user interface elements:
while the application is in a fourth mode, and in accordance with a determination that the user interface element of the second set of virtual user interface elements is the last user interface element of the second set of virtual user interface elements, displaying the indication of focus on the first user interface element of the second set of virtual user interface elements.

10. The method of claim 1, further comprising:
in response to detecting the first user input while the indication of focus is on the last user interface element of the first set of native user interface elements, removing display of the indication of focus on the last user interface element of the first set of native user interface elements without displaying the indication of focus on other user interface elements of the one or more user interface elements of the first set of native user interface elements.

11. The method of claim 1, further comprising:
in response to detecting the second user input while the indication of focus is on the last user interface element of the second set of virtual user interface elements, removing display of the indication of focus on the last user interface element of the second set of virtual user interface elements without displaying the indication of focus on other user interface elements of the one or more user interface elements of the second set of virtual user interface elements.

12. The method of claim 1, further comprising:
while the indication of focus is not on any of the second set of virtual user interface elements, displaying the virtualized region as an inactive region of the application.

13. The method of claim 1, further comprising:
in response to detecting the first user input while the indication of focus is on a user interface element of the first set of native user interface elements, displaying a first animation indicative of a removal of display of the indication of focus on the user interface element of the first set of native user interface elements; and
in response to detecting the second user input while the indication of focus is on a user interface element of the second set of virtual user interface elements, displaying a second animation indicative of the removal of display of the indication of focus on the user interface element of the second set of virtual user interface elements.

14. The method of claim 1, wherein the native region comprises borders of the user interface of the application, and wherein the virtualized region is an internal region of the native region.

15. The method of claim 1, further comprising:
detecting a first press gesture on a tab key of a keyboard that is communicatively connected to the electronic device, wherein the first user input is the first press gesture on the tab key; and
detecting a second press gesture on the tab key of the keyboard, wherein the second user input is the second press gesture on the tab key.

16. The method of claim 1, further comprising:
in accordance with a determination that focus is on a user interface element of the first set of native user interface elements, displaying the indication of focus on the user interface element of the first set of native user interface elements;
in accordance with a determination that focus is not on the user interface element of the first set of native user interface elements, removing display of the indication of focus on the user interface element of the first set of native user interface elements;

in accordance with a determination that focus is on a user interface element of the second set of virtual user interface elements, displaying the indication of focus on the user interface element of the second set of virtual user interface elements; and in accordance with a determination that focus is not on the user interface element of the second set of virtual user interface elements, removing display of the indication of focus on the user interface element of the second set of virtual user interface elements.

17. The method of claim 1, further comprising:

while the indication of focus is on a user interface element of the first set of native user interface elements, displaying the user interface element as a selectable user interface element of the first set of native user interface elements;

while the indication of focus is not on the user interface element of the first set of native user interface elements, displaying the user interface element as a non-selectable user interface element of the first set of native user interface elements;

while the indication of focus is on a user interface element of the second set of virtual user interface elements, displaying the user interface element as a selectable user interface element of the second set of virtual user interface elements; and while the indication of focus is not on the user interface element of the second set of virtual user interface elements, displaying the user interface element as a non-selectable user interface element of the second set of virtual user interface elements.

18. An electronic device, comprising:

a display;
one or more input devices;
one or more processors;
memory; and
one or more programs, wherein the one or more programs are stored in the memory and configured to be executed by the one or more processors, the one or more programs including instructions for:

displaying, on the display, a user interface of an application that runs natively on the device, wherein the user interface comprises a native region and a virtualized region, the virtualized region being a user interface region of the application that runs virtually on the electronic device;

concurrently displaying a first set of one or more native user interface elements in the native region and a second set of one or more virtual user interface elements in the virtualized region;

determining a pre-selected mode of the application, wherein the mode of the application designates how to shift focus between user interface elements of the first set of one or more native user interface elements and the second set of one or more virtual user interface elements, and wherein different modes of the application designate different shift focus sequences between the user interface elements of the first set of one or more native user interface elements and the second set of one or more virtual user interface elements;

while an indication of focus is on a user interface element of the first set of native user interface elements, detecting, via the one or more input devices, a first user input of a respective type;

in response to detecting the first user input while the indication of focus is on a user interface element of the first set of native user interface elements:

removing display of the indication of focus on the user interface element of the first set of native user interface elements; and in accordance with a determination that the user interface element of the first set of native user interface elements is the last user interface element of the first set of native user interface elements and based on the mode of the application, displaying the indication of focus on a first user interface element of the second set of virtual user interface elements; and while the indication of focus is on a user interface element of the second set of virtual user interface elements, detecting, via the one or more input devices, a second user input of the respective type;

in response to detecting the second user input while the indication of focus is on a user interface element of the second set of virtual user interface elements:

removing display of the indication of focus on the user interface element of the second set of virtual user interface elements; and in accordance with a determination that the user interface element of the second set of virtual user interface elements is the last user interface element of the second set of virtual user interface elements and based on the mode of the application, displaying the indication of focus on a first user interface element of the first set of native user interface elements.

19. A non-transitory computer readable storage medium storing one or more programs, the one or more programs comprising instructions which, when executed by one or more processors of an electronic device with a display and one or more input devices, cause the electronic device to:

display, on the display, a user interface of an application that runs natively on the device, wherein the user interface comprises a native region and a virtualized region, the virtualized region being a user interface region of the application that runs virtually on the electronic device;

concurrently display a first set of one or more native user interface elements in the native region and a second set of one or more virtual user interface elements in the virtualized region;

determine a pre-selected mode of the application, wherein the mode of the application designates how to shift focus between user interface elements of the first set of one or more native user interface elements and the second set of one or more virtual user interface elements, and wherein different modes of the application designate different shift focus sequences between the user interface elements of the first set of one or more native user interface elements and the second set of one or more virtual user interface elements;

while an indication of focus is on a user interface element of the first set of native user interface elements, detect, via the one or more input devices, a first user input of a respective type;

in response to detecting the first user input while the indication of focus is on a user interface element of the first set of native user interface elements:

remove display of the indication of focus on the user interface element of the first set of native user interface elements; and in accordance with a determination that the user interface element of the first set of native user interface elements is the last user interface element of the first set of native user interface elements and based on the mode of the application, display the indication of focus on a first user interface element of the second set of virtual user interface elements; and while the indication of focus is on a user interface element of the second set of virtual user interface elements, detect, via the one or more input devices, a second user input of the respective type;

in response to detecting the second user input while the indication of focus is on a user interface element of the second set of virtual user interface elements:
- remove display of the indication of focus on the user interface element of the second set of virtual user interface elements; and
- in accordance with a determination that the user interface element of the second set of virtual user interface elements is the last user interface element of the second set of virtual user interface elements and based on the mode of the application, display the indication of focus on a first user interface element of the first set of native user interface elements.

* * * * *